United States Patent
Gadkarec et al.

(10) Patent No.: US 7,998,898 B2
(45) Date of Patent: *Aug. 16, 2011

(54) SORBENT COMPRISING ACTIVATED CARBON, PROCESS FOR MAKING SAME AND USE THEREOF

(75) Inventors: Kishor Purushottam Gadkarec, Big Flats, NY (US); Benedict Y Johnson, Horseheads, NY (US); Peiqiong Q Kuang, Horseheads, NY (US); Anbo Liu, Painted Post, NY (US); Youchun Shi, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 11/977,843

(22) Filed: Oct. 26, 2007

(65) Prior Publication Data
US 2009/0111690 A1  Apr. 30, 2009

(51) Int. Cl.
*B01D 45/00* (2006.01)
*B01D 47/00* (2006.01)
*B01J 23/00* (2006.01)
*B01J 23/74* (2006.01)
*C01B 31/08* (2006.01)

(52) U.S. Cl. ........ 502/417; 502/182; 502/184; 502/185; 502/416; 423/215.5

(58) Field of Classification Search ............ None
See application file for complete search history.

(56) References Cited

U.S. PATENT DOCUMENTS

| | | | |
|---|---|---|---|
| 4,305,827 A | 12/1981 | Sasaki | |
| 4,338,288 A | 7/1982 | Rollmann | |
| 4,482,641 A | 11/1984 | Wennerberg | |
| 4,491,609 A | 1/1985 | Degel et al. | |
| 4,500,327 A | 2/1985 | Nishino et al. | |
| 4,518,704 A | 5/1985 | Okabayashi et al. | |
| 4,656,153 A | 4/1987 | Wennerberg | |
| 4,701,212 A | 10/1987 | Yan | |
| 4,708,853 A | 11/1987 | Matviya et al. | |
| 4,814,152 A | 3/1989 | Yan | |
| 4,831,003 A | 5/1989 | Lang et al. | |

(Continued)

FOREIGN PATENT DOCUMENTS
EP  0487370 B1  5/1992
(Continued)

OTHER PUBLICATIONS
Wilhelm; Generation and disposal of Petroleum Processing Waste that contains Mercury; Environmental Progress; vol. 18, No. 2 pages 130-143; 1999.*

(Continued)

*Primary Examiner* — Melvin C Mayes
*Assistant Examiner* — Guinever S Gregorio
(74) *Attorney, Agent, or Firm* — Joseph M. Homa

(57) ABSTRACT

A sorbent body adapted for abating toxic elements from a fluid stream, such as a carbon combustion flue gas stream or a syngas stream produced in coal gasification process, and process for making such sorbent. The sorbent body comprises an activated carbon matrix defining a plurality of pores, sulfur and an additive adapted for promoting the abatement of toxic elements from the fluid stream. At least one of the additive is formed into the sorbent body by in-situ forming such as in-situ extrusion. The sorbent is useful for abatement of, e.g., arsenic, cadmium, mercury and selenium from gas streams.

23 Claims, 3 Drawing Sheets

U.S. PATENT DOCUMENTS

| | | | |
|---|---|---|---|
| 4,889,698 A | 12/1989 | Moller et al. | 423/210 |
| 4,956,162 A | 9/1990 | Smith et al. | 423/244 |
| 4,970,189 A | 11/1990 | Tachibana | |
| 5,043,310 A | 8/1991 | Takeuchi et al. | |
| 5,245,106 A | 9/1993 | Cameron et al. | |
| 5,278,123 A | 1/1994 | Chopin et al. | |
| 5,288,306 A | 2/1994 | Aibe et al. | |
| 5,350,728 A | 9/1994 | Cameron et al. | |
| 5,403,548 A | 4/1995 | Aibe et al. | |
| 5,451,444 A | 9/1995 | DeLiso et al. | 3/12 |
| 5,487,917 A | 1/1996 | Gadkaree | 3/2 |
| 5,488,023 A | 1/1996 | Gadkaree et al. | 21/18 |
| 5,505,766 A | 4/1996 | Chang | 95/134 |
| 5,510,063 A | 4/1996 | Gadkaree et al. | 264/29.7 |
| 5,597,617 A | 1/1997 | DeLiso et al. | 3/2 |
| 5,601,701 A | 2/1997 | Cameron et al. | |
| 5,685,986 A | 11/1997 | Yamada et al. | |
| 5,750,026 A | 5/1998 | Gadkaree et al. | 210/502.1 |
| 5,820,967 A | 10/1998 | Gadkaree | 428/116 |
| 5,820,969 A | 10/1998 | Satoh | 5/66 |
| 5,914,294 A | 6/1999 | Park et al. | |
| 5,998,328 A | 12/1999 | Dawes et al. | 21/18 |
| 6,024,899 A | 2/2000 | Peng et al. | 31/2 |
| 6,097,011 A | 8/2000 | Gadkaree et al. | 1/2 |
| 6,103,205 A | 8/2000 | Wojtowicz et al. | |
| 6,136,749 A * | 10/2000 | Gadkaree et al. | 502/183 |
| 6,149,820 A | 11/2000 | Pedersen | |
| 6,156,697 A | 12/2000 | Gadkaree | 20/20 |
| 6,187,713 B1 | 2/2001 | Gadkaree | 31/12 |
| 6,228,803 B1 | 5/2001 | Gadkaree et al. | 31/8 |
| 6,248,691 B1 | 6/2001 | Gadkaree et al. | 20/2 |
| 6,251,822 B1 | 6/2001 | Peng et al. | 31/8 |
| 6,258,334 B1 | 7/2001 | Gadkaree et al. | 53/46 |
| 6,328,939 B1 | 12/2001 | Amrhein | 423/210 |
| 6,372,289 B1 | 4/2002 | Hickman | 3/2 |
| 6,455,023 B1 | 9/2002 | Gadkaree et al. | |
| 6,472,343 B1 | 10/2002 | McCrae et al. | |
| 6,503,470 B1 | 1/2003 | Nolan et al. | 423/210 |
| 6,573,212 B2 | 6/2003 | McCrae et al. | |
| 6,579,507 B2 | 6/2003 | Pahlmann et al. | 423/210 |
| 6,610,263 B2 | 8/2003 | Pahlmann et al. | 423/210 |
| 6,682,667 B1 | 1/2004 | Matviya | |
| 6,696,384 B2 | 2/2004 | McCrae et al. | |
| 6,719,828 B1 | 4/2004 | Lovell et al. | |
| 6,787,494 B2 | 9/2004 | Tsuji et al. | |
| 6,790,420 B2 | 9/2004 | Breen et al. | 423/215.5 |
| 6,806,398 B2 * | 10/2004 | Sakai et al. | 585/836 |
| 6,914,034 B2 | 7/2005 | Vo | |
| 6,953,494 B2 | 10/2005 | Nelson, Jr. | |
| 7,017,757 B2 | 3/2006 | Wolff et al. | |
| 7,160,366 B2 | 1/2007 | Blackburn et al. | |
| 7,250,387 B2 | 7/2007 | Durante et al. | |
| 7,288,499 B1 | 10/2007 | Lovell et al. | |
| 7,297,175 B2 | 11/2007 | Miwa | 55/523 |
| 7,370,657 B2 | 5/2008 | Zhuang et al. | |
| 2003/0050711 A1 | 3/2003 | Laurencin et al. | 623/23.72 |
| 2003/0075484 A1 | 4/2003 | Sakai et al. | |
| 2004/0074391 A1 | 4/2004 | Durante et al. | |
| 2005/0059549 A1 | 3/2005 | Vo | |
| 2005/0066817 A1 | 3/2005 | Wolff | |
| 2005/0093189 A1 | 5/2005 | Vo | |
| 2005/0100699 A1 | 5/2005 | Durante et al. | |
| 2005/0150835 A1 | 7/2005 | Vo | |
| 2005/0152821 A1 | 7/2005 | Durante et al. | |
| 2005/0155934 A1 | 7/2005 | Vo et al. | |
| 2005/0247635 A1 | 11/2005 | Vo et al. | |
| 2006/0045829 A1 | 3/2006 | Dodwell et al. | |
| 2006/0048646 A1 | 3/2006 | Olson et al. | |
| 2006/0051270 A1 | 3/2006 | Brunette | |
| 2006/0096926 A1 | 5/2006 | Mazyck et al. | 210/663 |
| 2006/0116287 A1 | 6/2006 | Durante et al. | |
| 2006/0178263 A1 | 8/2006 | Tatsuhara et al. | |
| 2006/0205592 A1 | 9/2006 | Chao et al. | |
| 2006/0229200 A1 | 10/2006 | Yao et al. | |
| 2006/0229476 A1 | 10/2006 | Mitchell, Sr. et al. | |
| 2007/0092418 A1 | 4/2007 | Mauldin et al. | |
| 2007/0104631 A1 * | 5/2007 | Durante et al. | 423/210 |
| 2007/0160517 A1 | 7/2007 | Fan et al. | |
| 2007/0179056 A1 | 8/2007 | Baek et al. | |
| 2007/0232488 A1 | 10/2007 | Akiyama et al. | |
| 2007/0234902 A1 | 10/2007 | Fair et al. | |
| 2007/0261557 A1 | 11/2007 | Gadkaree et al. | 96/121 |
| 2007/0264179 A1 | 11/2007 | Gadkaree et al. | 423/109 |
| 2007/0265161 A1 | 11/2007 | Gadkaree et al. | 502/417 |
| 2007/0292328 A1 | 12/2007 | Yang et al. | |
| 2008/0132408 A1 | 6/2008 | Mitchell et al. | |
| 2008/0207443 A1 | 8/2008 | Gadkaree et al. | 502/417 |

FOREIGN PATENT DOCUMENTS

| | | |
|---|---|---|
| EP | 0 894 530 | 2/1999 |
| GB | 2 122 916 | 1/1984 |
| JP | 5146687 A | 6/1993 |
| JP | 11-147707 | 6/1999 |
| JP | 2000-218164 | 8/2000 |
| JP | 2001-079346 | 3/2001 |
| JP | 2001-240405 | 9/2001 |
| JP | 2005-306710 | 11/2005 |
| JP | 2007-117863 | 5/2007 |
| WO | 2005/061099 A1 | 7/2005 |
| WO | 2007/114849 A2 | 10/2007 |
| WO | 2007/127652 A2 | 11/2007 |
| WO | 2007/133487 | 11/2007 |
| WO | 2007/133492 | 11/2007 |
| WO | 2007/133568 | 11/2007 |
| WO | 2007/133867 A2 | 11/2007 |
| WO | 2007/141577 | 12/2007 |
| WO | 2008/020250 | 2/2008 |
| WO | 2008/106111 | 9/2008 |
| WO | 2008/143831 | 11/2008 |

OTHER PUBLICATIONS

Office Action dated Feb. 1, 1995, during prosecution of U.S. Appl. No. 08/289,434.

Office Action dated Jun. 1, 1995, during prosecution of U.S. Appl. No. 08/289,434.

Notice of Allowance dated Aug. 2, 1995, during prosecution of U.S. Appl. No. 08/289,434.

Office Action dated Mar. 25, 1998, during prosecution of U.S. Appl. No. 08/741,840.

Office Action dated Sep. 16, 1998, during prosecution of U.S. Appl. No. 08/741,840.

Advisory Action dated Dec. 21, 1998, during prosecution of U.S. Appl. No. 08/741,840.

Notice of Allowance dated Feb. 9, 2000, during prosecution of U.S. Appl. No. 09/116,183.

Office Action dated Mar. 22, 2000, during prosecution of U.S. Appl. No. 09/231,860.

DOE-National Energy Technology Laboratory, "In-House Research on Mercury Measurement and Control at NETL" Pittsburgh, PA. Nov. 2001.

DOE-National Energy Technology Laboratory, "DOE/NETL's Phase II Plans for Full-Scale Mercury Removal Technology Field-Testing", Presentation at 2000 Air Quality III conference Sep. 10, 2002 Arlington, VA.

National Academy of Sciences (NAS), National Research Council, "Toxicological effects of Methylmercury", National Academy Press, Washington, D.C., 2000.

Agency for Toxic Substances and Disease Registry (ATSDR), "Toxicological Profile for Mercury", Public Health Service, U.S. Department of Health and Human Services, Atlanta, GA. 1999.

DOE-Energy Information Administration, "Annual Energy Outlook 2004 with Projections to 2025", DOE/EIA-0383(2004), Jan. 2004.

EPA—Office of Air Quality Planning and Standards, Office of Research and Development, "Mercury Study Report to Congress", Dec. 1997.

Office Action pertaining to U.S. Appl. No. 12/599,896 dated Mar. 3, 2011.

* cited by examiner

US 7,998,898 B2

SORBENT COMPRISING ACTIVATED CARBON, PROCESS FOR MAKING SAME AND USE THEREOF

This application claims the benefit of priority under 35 U.S.C. §119(e) of U.S. Provisional Application No. 60/966,558 filed on May 14, 2007.

FIELD OF THE INVENTION

The present invention relates to sorbent bodies comprising activated carbon. In particular, the present invention relates to sorbent bodies comprising activated carbon and sulfur, and capable of removing toxic elements from a fluid stream such as a gas stream, process for making such sorbent bodies and use of such sorbent bodies in abating such toxic elements. The present invention is useful, for example, in removing mercury from the flue gas stream resulting from carbon combustion.

BACKGROUND OF THE INVENTION

Mercury is both a global pollutant and a contaminant that can be transformed to a potentially toxic species (e.g., methylmercury) under natural conditions. Mercury emitted to the atmosphere can travel thousands of miles before being deposited to the earth. Studies show that mercury from the atmosphere can also be deposited in areas near the emission source. Mercury intake by human beings, especially children, can cause a variety of health problems.

Coal-fired power plants and medical and municipal waste incineration are major sources of human activity relating to mercury emission to the atmosphere. It is estimated that there are 48 tons of mercury emitted from coal-fired power plants in US annually. However, so far there is no effective mercury emission control technology available at a reasonable cost, especially for elemental mercury emission control.

The state of the art technology that has shown promise for controlling elemental mercury as well as oxidized mercury is active carbon injection (ACI). The ACI process includes injecting active carbon powder into the flue gas stream and using fabric fiber (FF) or electrostatic precipitator (ESP) to collect the active carbon powder that has adsorbed mercury. Generally, ACI technologies require a high carbon to Hg ratio to achieve the desired mercury removal level (>90%), which results in a high cost for sorbent material. The high carbon to Hg ratio suggests that ACI does not utilize the mercury sorption capacity of carbon powder efficiently. A major problem associated with ACI technology is cost. If only one particle collection system is used, the commercial value of fly ash is sacrificed due to its mixing with contaminated activated carbon powder. A system with two separate powder collectors and injecting activated carbon sorbent between the first collector for fly ash and the second collector, or a baghouse, for activated carbon powder, may be used. Baghouse with high collection efficiency may be installed in the power plant facilities. However, these measures are costly and may be impractical, especially for small power plants.

Since water-soluble (oxidized) mercury is the main mercury species in bituminous coal flue gas with high concentrations of $SO_2$ and HCl, bituminous coal-fired plants may be able to remove 90% mercury using a wet scrubber combined with NOx and/or $SO_2$ control technologies. Mercury emission control can also achieve as a co-benefit of particulate emission control. Chelating agent may be added to a wet scrubber to sequestrate the mercury from emitting again. However, a chelating agent adds to the cost due to the problems of corrosion of the metal scrubber equipment and treatment of chelating solution. However, elemental mercury is the dominant mercury species in the flue gas of sub-bituminous coal or lignite coal and a wet scrubber is not effective for removal of elemental mercury unless additional chemicals are added to the system. The prior art discloses adding various chemicals to the gas stream to aid the removal of mercury. However, it is undesirable to add additional potentially environmentally hazardous material into the flue gas system.

Certain industrial gases, such as the syngas produced in coal gasification, may contain toxic elements such as arsenic, cadmium and selenium, in addition to mercury. It is highly desired that all these toxic elements be substantially abated before the syngas is supplied for industrial and/or residential use.

There is a genuine need of a sorbent material capable of removing mercury and/or other toxic elements from fluid streams such as flue gas and syngas with a higher capacity than activated carbon powder alone. It is desired that such sorbent material can be produced at a reasonable cost and conveniently used, such as in a fixed bed.

The present invention satisfies this need.

SUMMARY OF THE INVENTION

Thus, according to a first aspect of the present invention, provided is a sorbent body comprising:
  an activated carbon matrix defining a plurality of pores;
  sulfur; and
  an additive adapted for promoting the removal of at least one of Hg, Cd, Se and As from a fluid stream,
  wherein:
  the additive is distributed throughout the activated carbon matrix. According to certain embodiments, the additive is distributed substantially homogeneously throughout the activated carbon matrix.

According to certain embodiments, the sorbent body is in the form of a monolith. According to certain embodiments, the sorbent body is in the form of a monolithic honeycomb with a plurality of channels through which gas and liquid may pass.

According to certain embodiments of the sorbent body of the present invention, sulfur is distributed throughout the activated carbon matrix. According to certain embodiments, sulfur is distributed substantially homogeneously throughout the activated carbon matrix.

According to certain embodiments of the sorbent body of the present invention, at least part of sulfur is chemically (such as covalently and/or ionically) bonded to the activated carbon matrix.

According to certain embodiments of the sorbent body of the present invention, the activated carbon matrix defines a plurality of nanoscale pores.

According to certain embodiments of the sorbent body of the present invention, the additive is present on the wall surface of at least part of the nanoscale pores.

According to certain embodiments of the sorbent body of the present invention, sulfur is present on the wall surface of at least part of the nanoscale pores.

According to certain embodiments of the sorbent body of the present invention, the activated carbon matrix further defines a plurality of microscale pores.

According to certain embodiments of the sorbent body of the present invention, at least part of sulfur is present in a state capable of covalently bonding with Hg.

According to certain embodiments of the sorbent body of the present invention, at least 10% of the sulfur on the surface of the walls of the pores is essentially at zero valency, in certain embodiments at least 20%, in certain embodiments at least 30%, in certain embodiments at least 40%, in certain embodiments at least 50%, in certain embodiments at least 60%, when measured by XPS.

According to certain embodiments of the present invention, the sorbent body further comprises an inorganic filler.

According to certain embodiments of the sorbent body of the present invention, the inorganic filler is selected from: silica; mullite; cordierite; alumina; other oxide glass; other ceramic materials; other refractory materials; and mixtures and combinations of at least two thereof.

According to certain embodiments of the sorbent body of the present invention, the sorbent body comprises less than 40%, less than 30%, less than 20%, less than 10%, less than 9%, less than 8%, less than 7%, less than 6%, less than 5%, less than 4%, less than 3%, less than 2%, less than 1%, or less than 0.5% by weight of inorganic filler. In one embodiment, the sorbent body of the present invention comprises no inorganic filler.

According to certain embodiments of the sorbent body of the present invention, the additive is selected from: (i) halides and oxides of alkali and alkaline earth metals; (ii) precious metals and compounds thereof; (iii) oxides, sulfides, and salts of vanadium, chromium, manganese, iron, cobalt, nickel, copper, zinc, niobium, molybdenum, silver, tungsten and lanthanoids; and (iv) combinations and mixtures of two or more of (i), (ii) and (iii).

According to certain embodiments of the sorbent body of the present invention, the additive is selected from: (i) oxides, sulfides and salts of manganese; (ii) oxides, sulfides and salts of iron; (iii) combinations of (i) and KI; (iv) combinations of (ii) and KI; and (v) mixtures and combinations of any two or more of (i), (ii), (iii) and (iv). According to certain embodiments of the present invention, the sorbent body comprises an alkaline earth metal hydroxide as an additive for promoting the removal of toxic elements, such as $Ca(OH)_2$.

According to certain embodiments of the present invention, the sorbent body comprises at least 90% by weight of activated carbon, sulfur and the additive in total (in certain embodiments at least 95%, in certain other embodiments at least 98%).

According to certain embodiments of the present invention, the sorbent body comprises from 50% to 97% by weight of carbon (in certain embodiments from 60% to 97%, in certain other embodiments from 85% to 97%).

According to certain embodiments of the present invention, the sorbent body comprises from 1% to 20% by weight of sulfur (in certain embodiments from 1% to 15%, in certain other embodiments from 3% to 8%).

According to certain embodiments of the present invention, the sorbent body comprises from 1% to 25% by weight of the additive (in certain embodiments from 1% to 20%, in certain other embodiments from 1% to 15%, in certain other embodiments from 3% to 10%).

According to certain embodiments of the present invention, the sorbent body has a specific surface area from 50 to 2000 $m^2 \cdot g^{-1}$, in certain embodiments from 200 to 2000 $m^2 \cdot g^{-1}$, in certain other embodiments from 400 to 1500 $m^2 \cdot g^{-1}$.

According to certain embodiments of the present invention, the sorbent body is a monolithic honeycomb having a cell density from 25 to 500 cells·$inch^{-2}$ (3.88 to 77.5 cells·$cm^{-2}$), from 50 to 200 cells·$inch^{-2}$ (7.75 to 31.0 cells·$cm^{-2}$) in certain other embodiments, and from 50 to 100 cells·$inch^{-2}$ (7.75 to 15.5 cells·$cm^{-2}$) in certain other embodiments.

According to certain embodiments of the present invention, the sorbent body is a monolithic honeycomb body having a plurality of channels, where part of the channels are plugged at one end of the sorbent body, and part of the channels are plugged at the other end of the sorbent body.

According to certain embodiments, if one channel is plugged at one end, at least a majority (in certain embodiments all) of the channels immediately proximate thereto are plugged at the other end.

According to certain embodiments of the present invention, the sorbent body has an initial Hg removal efficiency of at least 91% with respect to RFG1 (defined infra), in certain embodiments of at least 95%, in certain other embodiments at least 98%, in certain other embodiments at least 99%. According to certain embodiments of the present invention, the sorbent body has an initial Hg removal efficiency of at least 91% with respect to RFG2 (defined infra), in certain embodiments of at least 95%, in certain other embodiments at least 98%, in certain other embodiments at least 99%. According to certain embodiments of the present invention, the sorbent body has an initial Hg removal efficiency of at least 91% with respect to RFG3 (defined infra), in certain embodiments of at least 95%, in certain other embodiments at least 98%, in certain other embodiments at least 99%.

According to certain embodiments of the present invention, the sorbent body has a Hg removal capacity of 0.05 $mg \cdot g^{-1}$ with respect to RFG1, in certain embodiments of at least 0.10 $mg \cdot g^{-1}$, in certain other embodiments at least 0.15 $mg \cdot g^{-1}$, in certain other embodiments at least 0.20 $mg \cdot g^{-1}$, in certain other embodiments at least 0.30 $mg \cdot g^{-1}$. According to certain embodiments of the present invention, the sorbent body has an Hg removal capacity of 0.05 $mg \cdot g^{-1}$ with respect to RFG2, in certain embodiments of at least 0.10 $mg \cdot g^{-1}$, in certain other embodiments at least 0.15 $mg \cdot g^{-1}$, in certain other embodiments at least 0.20 $mg \cdot g^{-1}$, in certain other embodiments at least 0.30 $mg \cdot g^{-1}$. According to certain embodiments of the present invention, the sorbent body has an Hg removal capacity of 0.05 $mg \cdot g^{-1}$ with respect to RFG3, in certain embodiments of at least 0.10 $mg \cdot g^{-1}$, in certain other embodiments at least 0.15 $mg \cdot g^{-1}$, in certain other embodiments at least 0.20 $mg \cdot g^{-1}$ in certain other embodiments at least 0.30 $mg \cdot g^{-1}$.

A second aspect of the present invention is a process for making a sorbent body comprising an activated carbon matrix, sulfur, and an additive adapted for promoting the removal of a toxic element from a fluid stream, wherein the additive is distributed throughout the activated carbon matrix, comprising the following steps:

(A) providing a batch mixture body formed of a batch mixture material comprising a carbon-source material, a sulfur-source material, an additive-source material and an optional filler material, wherein the additive-source material is substantially homogeneously distributed in the mixture;

(B) carbonizing the batch mixture body by subjecting the batch mixture body to an elevated carbonizing temperature in an $O_2$-depleted atmosphere; and (C) activating the carbonized batch mixture body at an elevated activating temperature in a gaseous atmosphere selected from $CO_2$, $H_2O$, a mixture of $CO_2$ and $H_2O$, a mixture of $CO_2$ and nitrogen, a mixture of $H_2O$ and nitrogen, and a mixture of $CO_2$ and another inert gas.

According to certain embodiments of the process of the present invention, in step (A), the carbon-source material comprises: synthetic carbon-containing polymeric material; activated carbon powder; charcoal powder; coal tar pitch; petroleum pitch; wood flour; cellulose and derivatives thereof; wheat flour; nut-shell flour; starch; coke; coal; or mixtures or combinations of any two or more thereof.

According to certain embodiments of the process of the present invention, in step (A), the sulfur-source material comprises: sulfur powder; sulfur-containing powdered resin; sulfides; sulfates; and other sulfur-containing compounds; or mixtures or combination of any two or more thereof.

According to certain embodiments of the process of the present invention, in step (A), the filler material comprises:

mullite; cordierite; silica; alumina; other oxide glass; other oxide ceramics; or other refractory material.

According to certain embodiments of the process of the present invention, in step (A), the additive-source material comprises: (i) halides and oxides of alkali and alkaline earth metals; (ii) precious metals and compounds thereof; (iii) oxides, sulfides, and salts of vanadium, chromium, manganese, iron, cobalt, nickel, copper, zinc, niobium, molybdenum, silver, tungsten and lanthanoids; or (iv) combinations and mixtures of two or more of (i), (ii) and (iii). According to certain embodiments of the process of the present invention, in step (A), the additive-source material comprises: (i) oxides, sulfides, sulfates, acetates and salts of manganese; (ii) oxides, sulfides and salts of iron; (iii) combinations of (i) and KI; (iv) combinations of (ii) and KI; and/or (v) mixtures and combinations of any two or more of (i), (ii), (iii) and (iv).

According to certain embodiments of the process of the present invention, in step (A), the batch mixture material comprises a phenolic resin or a resin based on furfuryl alcohol.

According to certain embodiments of the process of the present invention, in step (A), the batch mixture is curable when being subjected to heat treatment at a curing temperature.

According to certain embodiments of the process of the present invention, step (A) comprises the following step (A1):

(A1) extruding the batch mixture material to form an extruded batch mixture body.

According to certain embodiments of the process of the present invention, step (A) further comprises the following step (A2) after step (A1):

(A2) curing the extruded batch mixture body at a curing temperature to obtain a cured batch mixture body.

According to certain embodiments of the process of the present invention, in step (A), the extruded batch mixture body takes the shape of a monolithic honeycomb having a plurality of channels.

According to certain embodiments of the process of the present invention, after step (C), the sorbent body takes the shape of a monolithic honeycomb having a plurality of channels.

According to certain embodiments of the process of the present invention, the batch mixture material is selected such that at the end of step (C), the sorbent body comprises less than 20% by weight of inorganic materials other than carbon, sulfur-containing inorganic material, and the additive (in certain embodiments less than 10%, in certain other embodiments less than 5%).

According to certain embodiments of the process of the present invention, the batch mixture material is selected such that at the end of step (C), the sorbent body comprises from 30%-50% by weight of inorganic materials other than carbon, sulfur-containing inorganic material and the additive, based on the total weight of carbon, sulfur-containing inorganic material and the additive.

According to certain embodiments of the process of the present invention, after step (C), the sorbent body thus obtained has a surface area from 50 m²/g to 2000 m²/g.

Another aspect of the present invention is an extruded batch mixture body comprising:
(I) an uncured, curable polymeric resin;
(II) particles of sulfur-containing material; and
(III) an additive adapted for promoting the removal of at least one of arsenic, cadmium, mercury and selenium from a fluid stream;

wherein the additive is distributed substantially homogeneously in the material forming the extruded batch mixture body.

According to certain embodiments of the extruded batch mixture body of the present invention, the particles of sulfur-containing material are distributed substantially homogeneously in the material forming the extruded batch mixture body.

According to certain embodiments of the extruded batch mixture body of the present invention, the sulfur-containing material comprises at least 50% by mole of elemental sulfur.

According to certain embodiments of the extruded batch mixture body of the present invention, the sulfur-containing material comprises elemental sulfur, sulfates, sulfites, sulfides, $CS_2$, and other sulfur-containing compounds.

According to certain embodiments of the extruded batch mixture body of the present invention, the extruded batch mixture further comprises:
(IV) a binder material; and/or
(V) an inorganic filler material; and/or
(VI) a lubricant.

According to certain embodiments of the extruded batch mixture body of the present invention, the extruded batch mixture comprises less than 20% by weight of inorganic material other than carbon, sulfur-containing inorganic material, water and the additive, in certain embodiments less than 10%, in certain other embodiments less than 5%.

According to certain embodiments of the extruded batch mixture body of the present invention, the extruded batch mixture comprises from 20% to 50% by weight of an inorganic material other than carbon, sulfur-containing inorganic material, water and the additive. In certain embodiments, the material is a heat-resistant inorganic material that is chemically stable at 800° C., in certain other embodiments at 1000° C.

According to certain embodiments of the extruded batch mixture body of the present invention, the extruded batch mixture comprises the heat-resistant inorganic material selected from cordierite, mullite, silica, alumina, other oxide glass, other oxide ceramic, other refractory materials, and mixtures and combinations thereof. According to certain embodiments, the heat-resistant inorganic material comprises microscale pores.

Another aspect of the present invention is directed to a process for abating As, Cd, Se and/or Hg from a fluid stream, comprising placing a sorbent body described summarily supra in the fluid stream (such as a gas stream). According to certain embodiments of this process, the fluid stream is a gas stream comprising mercury and at least 10% by mole of the mercury in the elemental state, in certain embodiments at least 30%, in certain embodiments at least 40%, in certain embodiments at least 50%, in certain other embodiments at least 60%.

According to certain embodiments of the process for abating toxic elements, the gas stream comprises mercury and less than 30 ppm by volume of HCl.

According to certain embodiments of the process for abating toxic elements, the gas stream comprises mercury and at least 3 ppm by volume of $SO_3$.

Certain embodiments of the present invention have one or more of the following advantages. First, sorbent materials having high specific surface area and large number of active sites capable of sorbing or promoting sorption of a toxic element can be produced and used effectively for abatement of toxic elements, especially arsenic, cadmium, mercury and selenium, particularly mercury. Second, the sorbent material of certain embodiments of the present invention is effective for sorption of not just oxidized mercury, but also elemental mercury. Further, the sorbent bodies according to certain embodiments of the present invention are found to be effective in removing mercury from flue gases with high and low concentrations of HCl alike. Last but not least, the sorbent bodies according to certain embodiments of the present invention are found to be effective in removing mercury from flue gases with high concentration of $SO_3$.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION OF THE INVENTION

Figure 1:
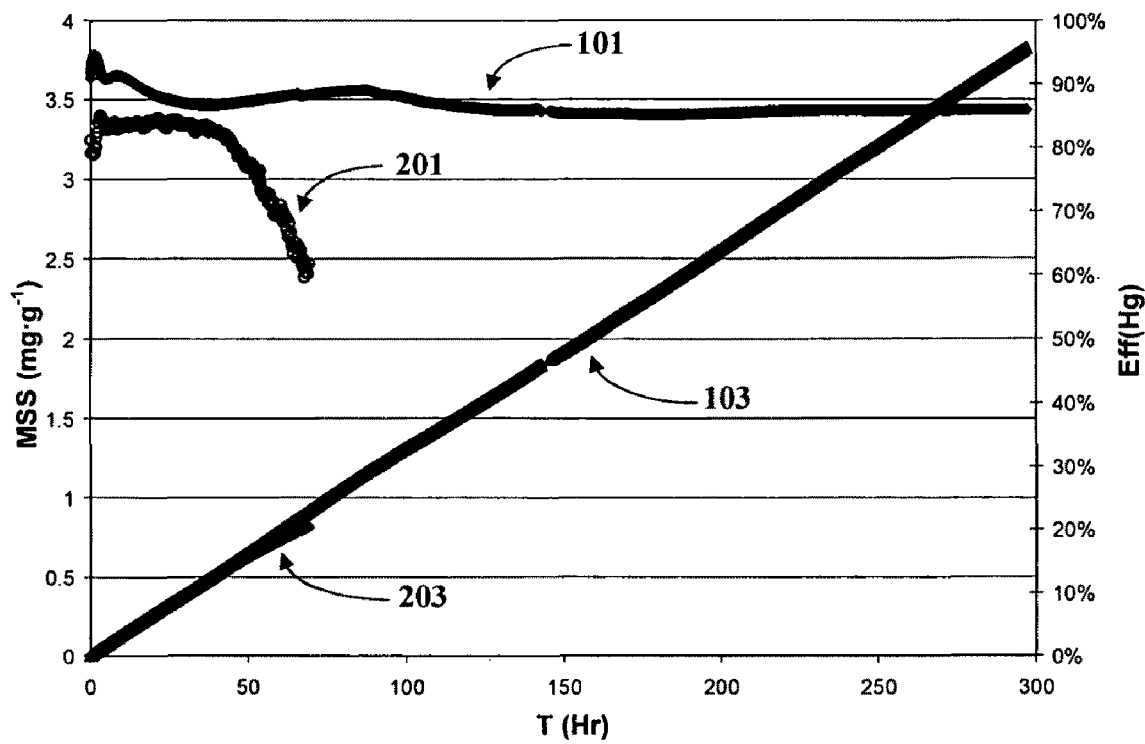
FIG. 1 is a diagram comparing the mercury removal capability of a tested sample of a sorbent comprising an in-situ extruded additive according to the present invention and a sorbent which comprises impregnated additive but no in-situ extruded additive over time.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a mercury containing compound" includes embodiments having two or more such mercury containing compounds, unless the context clearly indicates otherwise.

As used herein, a "wt %" or "weight percent" or "percent by weight" of a component, unless specifically stated to the contrary, is based on the total weight of the composition or article in which the component is included. As used herein, all percentages are by weight unless indicated otherwise. All ppm with respect to gases are by volume unless indicated otherwise.

In the present application, each element present in the sorbent body is referred to in the collective, including any such element at any oxidation state, unless indicated otherwise. Thus, the term "sulfur" as used herein includes sulfur element at all oxidation states, including, inter alia, elemental sulfur (0), sulfate (+6), sulfite (+4), and sulfide (−2). Thus, percentages of sulfur is calculated on the basis of elemental sulfur, with any sulfur in other states converted to elemental state for the purpose of calculation of the total amount of sulfur in the material. Percentages of an additive is calculated on the basis of the halides per se in cases of halides, the oxide of the relevant metal at the prevailing oxidative state under the activating conditions in cases of oxides, and on the basis of elemental metal in all other cases, for example in the case of precious metals and metals bound to sulfur.

By "in-situ extruded" is meant that the relevant material, such as sulfur and/or additive, is introduced into the body by incorporating at least part of the source material thereof into the batch mixture material, such that the extruded body comprises the source materials incorporated therein.

Distribution of sulfur, additive or other materials across a cross-section of the sorbent body, or an extrusion batch mixture body, or a batch mixture material of the present invention can be measured by various techniques, including, but not limited to, microprobe, XPS (X-ray photoelectron spectroscopy), and laser ablation combined with mass spectroscopy.

The methodology of characterizing the distribution of a certain material (e.g., sulfur, an additive, and the like) in a certain planar cross-section of a sorbent body, or other body, is described as follows. This methodology is referred to as "Distribution Characterization Method" in the present application.

Target test areas of the cross-section of at least 500 μm×500 μm size are chosen if the total cross-section is larger than 500 μm×500 μm. The full cross-section, if less than or equal to 500 μm×500 μm, would be a single target test area. The total number of target test areas is p (a positive integer).

Each target test area is divided by a grid into multiple separate 20 μm×20 μm zones. Only zones having an effective area (defined below) not less than 40 μm² are considered and those having an effective area lower than 40 μm² are discarded in the data processing below. Thus the total effective area (ATE) of all the square sample zones of the target test area is:

$$ATE = \sum_{i=1}^{n} ae(i),$$

where ae(i) is the effective area of zone i, and n is the total number of the square sample zones in the target test area, where $ae(i) \geq 40 \mu m^2$. Area of individual square zone ae(i) in square micrometers is calculated as follows:

$$ae(i) = 400 - av(i)$$

where av(i) is the total area in square micrometers of any voids, pores or free space larger than 10 μm² within square zone i.

Each square zone i is measured to have an average concentration C(i), expressed in terms of moles of sulfur atoms per unit effective area for sulfur, or moles of other relevant material in the case of an additive. All C(i) (i=1 to n) are then listed in descending order to form a permutation CON(1), CON(2), CON(3), ... CON(n), where CON(1) is the highest C(i) among all n zones, and CON(n) is the lowest C(i) among all n zones. The arithmetic average concentration of the 5% of all n zones in the target test area having the highest concentrations is CON(max). Thus:

$$CON(\text{max}) = \frac{\sum_{m=1}^{INT(0.05\times n)} CON(m)}{INT(0.05\times n)}.$$

where $INT(0.05\times n)$ is the smallest integer larger than or equal to $0.05\times n$. As used herein, the operator "INT(X)" yields the smallest integer larger than or equal to X.

The arithmetic average concentration of the 5% of all n zones in the target test area having the lowest concentrations is CON(min). Thus:

$$CON(\text{min}) = \frac{\sum_{m=INT(0.95\times n)}^{n} CON(m)}{n - INT(0.95\times n)}.$$

The arithmetic average concentration of the target test area is CON(av). Thus:

$$CON(av) = \frac{\sum_{m=1}^{n} CON(m)}{n}.$$

For all p target test areas, all CON(av)(k) (k=1 to p) are then listed in descending order to form a permutation CONAV(1), CONAV(2), CONAV(3), ... CONAV(p), where CONAV(1) is the highest CON(av)(k) among all p target test areas, and CONAV(p) is the lowest CON(av)(p) among all p target test areas. The arithmetic average concentration of all p target test areas is CONAV(av). Thus:

$$CONAV(av) = \frac{\sum_{k=1}^{p} CONAV(k)}{p}.$$

In certain embodiments of the bodies or materials according to the present invention, where the relevant material is distributed throughout the body, or the activated carbon matrix, or the material, it is desired that: in each target test area, the distribution thereof has the following feature: CON(av)/CON(min)≦30, and CON(max)/CON(av)≦30. In certain other embodiments, it is desired that CON(av)/CON(min)≦20, and CON(max)/CON(av)≦20. In certain other embodiments, it is desired that CON(av)/CON(min)≦15, and CON(max)/CON(av)≦15. In certain other embodiments, it is desired that CON(av)/CON(min)≦10, and CON(max)/CON(av)≦10. In certain other embodiments, it is desired that CON(av)/CON(min)≦5, and CON(max)/CON(av)≦5. In certain other embodiments, it is desired that CON(av)/CON(min)≦3, and CON(max)/CON(av)≦3. In certain other embodiments, it is desired that CON(av)/CON(min)≦2, and CON(max)/CON(av)≦2.

For a certain material or component to be "homogeneously distributed" to have a "homogeneous distribution" in a body or a material according to the present application, the distribution thereof according to the Distribution Characterization Method satisfies the following: In each target test area, for all CON(m) where 0.1n≦m≦0.9n: 0.5≦CON(m)/CON(av)≦2.

In certain embodiments, it is desired that 0.6≦CON(m)/CON(av)≦1.7. In certain other embodiments, it is desired that 0.7≦CON(m)/CON(av)≦1.4. In certain other embodiments, it is desired that 0.8≦CON(m)/CON(av)≦1.2. In certain other embodiments, it is desired that 0.9≦CON(m)/CON(av)≦1.1. In certain embodiments, for all CON(m) where 0.05n≦m≦0.95n: 0.5≦CON(m)/CON(av)≦2; in certain embodiments, 0.6≦CON(m)/CON(av)≦1.7. In certain other embodiments, it is desired that 0.7≦CON(m)/CON(av)≦1.4. In certain other embodiments, it is desired that 0.8≦CON(m)/CON(av)≦1.2. In certain other embodiments, it is desired that 0.9≦CON(m)/CON(av)≦1.1. In certain embodiments of the bodies (sorbent body, extrusion mixture body, and the like) and material of the present invention, in addition to any one of the features stated above in this paragraph with respect to each individual target test area, the distribution of the relevant material (e.g., sulfur, an additive, and the like) with respect to all p target test areas has the following feature: for all CONAV(k) where 0.1p≦k≦0.9p: 0.5≦CONAV(k)/CONAV(av)≦2; in certain embodiments, 0.6≦CONAV(k)/CONAV(av)≦1.7. In certain other embodiments, it is desired that 0.7≦CONAV(k)/CONAV(av)≦1.4. In certain other embodiments, it is desired that 0.8≦CONAV(k)/CONAV(av)≦1.2. In certain other embodiments, it is desired that 0.9≦CONAV(k)/CONAV(av)≦1.1. In certain other embodiments, it is desired that 0.95≦CONAV(k)/CONAV(av)≦1.05. In certain embodiments, for all CONAV(k) where 0.05p≦k≦0.95p: 0.5≦CONAV(k)/CONAV(av)≦2; in certain embodiments, 0.6≦CONAV(k)/CONAV(av)≦1.7. In certain other embodiments, it is desired that 0.7≦CONAV(k)/CONAV(av)≦1.4. In certain other embodiments, it is desired that 0.8≦CONAV(k)/CONAV(av)≦1.2. In certain other embodiments, it is desired that 0.9≦CONAV(k)/CONAV(av)≦1.1. In certain other embodiments, it is desired that 0.95≦CONAV(k)/CONAV(av)≦1.05.

A first aspect of the present invention is directed to a sorbent body adapted for removing mercury and other toxic elements from a fluid stream such as a flue gas stream resulting from coal combustion or waste incineration or syngas produced during coal gasification process. As described supra, it is generally known that such gas streams, before any abatement procedure is undertaken, contain various amounts of mercury and/or other toxic elements such as As, Cd and Se. Mercury abatement for those gas streams is one of the major concerns. Mercury can be present in elemental state or oxidized state at various proportions in such gas streams depending on the source material (e.g., bituminous coal, sub-bituminous coal, municipal waste, and medical waste) and process conditions.

The sorbent body of the present invention comprises an activated carbon matrix, sulfur and an additive adapted for promoting the removal of arsenic, cadmium, mercury and/or selenium from the fluid stream to be treated. The additive comprises a metal element. It is believed that, by a combination of a physical and chemical sorption, the sorbent body of the present invention is capable of binding and trapping mercury both at elemental state and oxidized state. The sorbent bodies and material of certain embodiments of the present invention are particularly effective for removing mercury at elemental state in a flue gas stream. This is particularly advantageous compared to certain prior art technology which is usually less effective in removing elemental mercury.

The sorbent body of the present invention may take various shapes. For example, the sorbent body may be a powder, pellets, and/or extruded monolith. The sorbent bodies of the present invention may be incorporated in a fixed sorbent bed through which the fluid stream to be treated flows. In certain embodiments, especially when used in treating the coal combustion flue gas in power plants or the syngas produced in coal gasification processes, it is highly desired that any fixed bed through which the gas stream passes has a low pressure-drop. To that end, it is desired that sorbent pellets packed in the fixed bed allow for sufficient gas passageways. In certain embodiments, it is particularly advantageous that the sorbent body of the present invention is in the form of extruded monolithic honeycomb having multiple channels. Cell density of the honeycomb can be adjusted during the extrusion process to achieve various degree of pressure-drop when in use. Cell density of the honeycomb can range from 25 to 500 cells·inch$^{-2}$ (3.88 to 77.5 cells·cm$^{-2}$) in certain embodiments, from 50 to 200 cells·inch$^{-2}$ (7.75 to 31.0 cells·cm$^{-2}$) in certain other embodiments, and from 50 to 100 cells·inch$^{-2}$ (7.75 to 15.5 cells·cm$^{-2}$) in certain other embodiments. In certain embodiments, the thickness of the cell walls ranges from 1 mil to 50 mil. To allow for a more intimate contact between the gas stream and the sorbent body material, it is desired in certain embodiments that part of the channels are plugged at one end of the sorbent body, and part of the channels are plugged at the other end of the sorbent body. In certain embodiments, it is desired that at each end of the sorbent body, the plugged and/or unplugged channels form a checkerboard pattern. In certain embodiments, it is desired that where one channel is plugged on one end (referred to as "the reference end") but not the opposite end of the sorbent body, at least a majority of the channels (preferably all in certain other embodiments) immediately proximate thereto (those sharing at least one wall with the channel of concern) are plugged at the other end of the sorbent body but not on the reference end. Multiple honeycombs can be stacked in various manners to form actual sorbent beds having various sizes, service duration, and the like, to meet the needs of differing use conditions.

Activated carbon, owing to its typically high specific area, has been used for abating mercury from flue gas stream of coal power plants. However, as described supra, activated carbon alone does not have sufficient removal capability. Using a combination of sulfur and activated carbon for mercury abatement was known. Whereas such combination does provide modest improvement over activated carbon alone in terms of mercury abatement capability, sorbent body having even higher mercury abatement efficiency and capacity, especially when used in a fixed bed, is highly desired.

The "activated carbon matrix," as used herein, means a network formed by interconnected carbon atoms and/or particles. As is typical for activated carbon materials, the matrix comprises wall structure defining a plurality of interconnected pores. The activated carbon matrix, along with sulfur and the additive, provides the backbone structure of the sorbent body. In addition, the large cumulative areas of the pores in the activated carbon matrix provide a plurality of sites where mercury sorption can occur directly, or where sulfur and the additive can be distributed, which further promote mercury sorption. It is to be noted that the pores defined by the activated carbon matrix can be different from the pores actually present in the sorbent body of the present invention. For example, a portion of the pores defined by the activated carbon matrix may be filled by an additive, sulfur, an inorganic filler, and combinations and mixtures thereof.

In certain embodiments of the present invention, the sorbent body comprises from 50% to 97% by weight of activated carbon, in certain embodiments from 60% to 97%, in certain other embodiments from 85% to 97%. In other embodiments, the sorbent body comprises at least 50% by weight of activated carbon, for example at least 60% by weight, at least 70% by weight, at least 80% by weight, at least 90% by weight, at least 95% by weight, or at least 97% by weight of activated carbon. Higher concentrations of activated carbon usually lead to higher porosity if the same level of carbonization and activation were used during the process of making the sorbent body of the present invention according to the process of the present invention for making such bodies to be detailed infra.

The pores defined by the activated carbon matrix in the sorbent body of the present invention can be divided into two categories: nanoscale pores having a diameter of less than or equal to 10 nm, and microscale pores having a diameter of higher than 10 nm. Pore size and distribution thereof in the sorbent body of the present invention can be measured by using techniques available in the art, such as, e.g., nitrogen adsorption. Both the surfaces of the nanoscale pores and the microscale pores together provide the overall high specific area of the sorbent body of the present invention. In certain embodiments of the sorbent body of the present invention, the wall surfaces of the nanoscale pores constitute at least 50% of the specific area of the sorbent body. In certain other embodiments, the wall surfaces of the nanoscale pores constitute at least 60% of the specific area of the sorbent body. In certain other embodiments, the wall surfaces of the nanoscale pores constitute at least 70% of the specific area of the sorbent body. In certain other embodiments, the wall surfaces of the nanoscale pores constitute at least 80% of the specific area of the sorbent body. In certain other embodiments, the wall surfaces of the nanoscale pores constitute at least 90% of the specific area of the sorbent body.

The sorbent bodies of the present invention are characterized by large specific surface area. In certain embodiments of the present invention, the sorbent bodies have specific areas ranging from 50 to 2000 m$^2$·g$^{-1}$. In certain other embodiments, the sorbent bodies of the present invention have specific areas ranging from 100 to 1800 m$^2$·g$^{-1}$. In certain other embodiments, the sorbent bodies of the present invention have specific areas ranging from 200 to 1500 m$^2$·g$^{-1}$. In certain other embodiments, the sorbent bodies of the present invention have specific areas ranging from 300 to 1200 m$^2$·g$^{-1}$. Higher specific area of the sorbent body can provide more active sites in the material for the sorption of toxic elements. However, if the specific area of the sorbent body is quite high, e.g., higher than 2000 m$^2$·g$^{-1}$, the sorbent body becomes quite porous and the mechanical integrity of the sorbent body suffers. This could be undesirable for certain embodiments where the strength of the sorbent body needs to meet certain threshold requirement.

The additive comprises a metallic element. Any such additive capable of promoting the removal of toxic elements or compounds (also known as "abatement" of toxic elements or compounds), especially mercury, arsenic, cadmium or selenium, from the fluid stream to be treated upon contacting can be included in the sorbent body of the present invention. The terms "removal" and "abatement" in this context are used interchangeably herein. Furthermore, those terms would be understood as covering reducing the presence of the toxic elements by a matter of degree in a fluid stream, i.e. by a certain percentage, and are not limited to complete removal or abatement of the toxic elements. The additive can function in one or more of the following ways, inter alia, to promote the removal of such toxic elements: (i) temporary or permanent chemical sorption (e.g., via covalent and/or ionic bonds) of a toxic element; (ii) temporary or permanent physical sorption of a toxic element; (iii) catalyzing the reaction/sorption of a toxic element with other components of the sorbent body; (iv) catalyzing the reaction of a toxic element with the ambient atmosphere to convert it from one form to another; (v) trapping a toxic element already sorbed by other components of the sorbent body; and (vi) facilitating the transfer of a toxic element to the active sorbing sites. Precious metals (Ru, Th, Pd. Ag, Re, Os, Ir, Pt and Au) and transition metals and compounds thereof are known to be effective for catalyzing such processes. Non-limiting examples of additives that can be included in the sorbent body of the present invention include: precious metals listed above and compounds thereof; alkali and alkaline earth halides, hydroxides or oxides; and oxides, sulfides, and salts of vanadium, chromium, manganese, iron, cobalt, nickel, copper, zinc, niobium, molybdenum, silver, tungsten, and lanthanoids. The metallic elements in the additive(s) can be at various valencies. For example, if iron is included in the additive, it may be present at +3, +2 or 0 valencies or as mixtures of differing valencies, and can be present as metallic iron (O), FeO, $Fe_2O_3$, $Fe_3O_8$, FeS, $FeCl_2$, $FeCl_3$, $FeSO_4$, and the like. For another example, if manganese is present in the additive, it may be present at +4, +2 or 0 valencies or as mixtures of differing valences, and can be present as metallic manganese (0), MnO, $MnO_2$, MnS, $MnCl_2$, $MnCl_4$, $MnSO_4$, and the like.

In certain embodiments of the sorbent body of the present invention, the additive(s) included advantageously are: alkali halides; and oxides, sulfides and salts of manganese and iron. In certain embodiments of the sorbent bodies of the present invention, the additive(s) included advantageously are: combination of KI and oxides, sulfides and salts of manganese; combination of KI and oxides, sulfides and salts of iron; or a combination of KI, oxides, sulfides and salts of manganese and iron. These combinations are found to be particularly effective in removing mercury, especially elemental mercury from a gas stream.

According to certain embodiments of the present invention, the sorbent body comprises an alkaline earth metal hydroxide as an additive for promoting the removal of toxic elements, such as $Ca(OH)_2$. Experiments have shown that $Ca(OH)_2$ can be particularly effective in promoting the removal of arsenic, cadmium and selenium from a gas stream.

The amount of the additive present in the sorbent bodies of the present invention can be selected, depending on the particular additive used, and application for which the sorbent bodies are used, and the desired toxic element removing capacity and efficiency of the sorbent body. In certain embodiments of the sorbent bodies of the present invention, the amount of the additive ranges from 1% to 20% by weight, in certain other embodiments from 2% to 18%, in certain other embodiments from 5% to 15%, in certain other embodiments from 5% to 10%.

If only one additive is present in the sorbent body of the present invention, it is distributed throughout the activated carbon matrix. If multiple additives are present, at least one of them is distributed throughout the activated carbon matrix. By "distributed throughout the activated carbon matrix" is meant that the relevant specified material (additive, sulfur, and the like) is present not just on the external surface of the sorbent body or cell walls, but also deep inside the sorbent body. Thus the presence of the specific additive can be, e.g.: (i) on the wall surfaces of nanoscale pores defined by the activated carbon matrix; (ii) on the wall surfaces of microscale pores defined by the activated carbon matrix; (iii) submerged in the wall structure of the activated carbon matrix; (iv) partly embedded in the wall structure of the activated carbon matrix; (v) partly fill and/or block some pores defined by the activated carbon matrix; and (vi) completely fill and/or block some pores defined by the activated carbon matrix. In situations (iii), (iv), (v) and (vi), the additive(s) actually forms part of the wall structure of the pores of the sorbent body. In certain embodiments of the sorbent body of the present invention, multiple additives are present and all of them are distributed throughout the activated carbon matrix. However, it is not required that all additives are distributed throughout the activated carbon matrix in all embodiments of the sorbent body of the present invention. Thus, in certain embodiments of the sorbent body of the present invention, multiple additives are present, with at least one of them distributed throughout the activated carbon matrix, and at least one of them distributed essentially mainly on the external surface area and/or cell wall surface of the sorbent body, and/or within a thin layer beneath the external surface area and/or cell wall surface. Therefore, in certain embodiments, part of the additive may be chemically bonded with other components of the sorbent body, such as carbon or sulfur. In certain other embodiments, part of the additive may be physically bonded with the activated carbon matrix or other components. Still in certain other embodiments, part of the additive is present in the sorbent body in the form of particles having nanoscale or microscale size.

Distribution of an additive in the sorbent body or other body or material according to the present invention can be measured and characterized by the Distribution Characterization Method described supra. In certain embodiments of the sorbent body of the present invention, the distribution of an additive has the following feature: in each target test area: $CON(av)/CON(min) \leq 30$, and $CON(max)/CON(av) \leq 30$. In certain other embodiments, it is desired that $CON(av)/CON(min) \leq 20$, and $CON(max)/CON(av) \leq 20$. In certain other embodiments, it is desired that $CON(av)/CON(min) \leq 15$, and $CON(max)/CON(av) \leq 15$. In certain other embodiments, it is desired that $CON(av)/CON(min) \leq 10$, and $CON(max)/CON(av) \leq 10$. In certain other embodiments, it is desired that $CON(av)/CON(min) \leq 5$, and $CON(max)/CON(av) \leq 5$. In certain other embodiments, it is desired that $CON(av)/CON(min) \leq 3$, and $CON(max)/CON(av) \leq 3$. In certain other embodiments, it is desired that $CON(av)/CON(min) \leq 2$, and $CON(max)/CON(av) \leq 2$.

In certain embodiments of the sorbent body of the present invention, at least one additive is homogeneously distributed throughout the activated carbon matrix according to the Distribution Characterization Method described supra. Thus: in each target test area, for all $CON(m)$ where $0.1n \leq m \leq 0.9n$: $0.5 \leq CON(m)/CON(av) \leq 2$.

In certain embodiments, it is desired that $0.6 \leq CON(m)/CON(av) \leq 1.7$. In certain other embodiments, it is desired that $0.7 \leq CON(m)/CON(av) \leq 1.4$. In certain other embodiments, it is desired that $0.8 \leq CON(m)/CON(av) \leq 1.2$. In certain other embodiments, it is desired that $0.9 \leq CON(m)/CON(av) \leq 1.1$. In certain embodiments, for all $CON(m)$ where $0.05n \leq m \leq 0.95n$: $0.5 \leq CON(m)/CON(av) \leq 2$; in certain embodiments, $0.6 \leq CON(m)/CON(av) \leq 1.7$. In certain other embodiments, it is desired that $0.7 \leq CON(m)/CON(av) \leq 1.4$. In certain other embodiments, it is desired that $0.8 \leq CON(m)/CON(av) \leq 1.2$. In certain other embodiments, it is desired that $0.9 \leq CON(m)/CON(av) \leq 1.1$. In certain embodiments of the bodies (sorbent body, extrusion mixture body, and the like) and material of the present invention, in addition to any one of the features stated above in this paragraph with respect to each individual target test area, the distribution of the relevant material (e.g., sulfur, an additive, and the like) with respect to all p target areas has the following feature: for all CONAV(k) where $0.1p \leq k \leq 0.9p$: $0.5 \leq CONAV(k)/CONAV(av) \leq 2$; in certain embodiments, $0.6 \leq CONAV(k)/CONAV(av) \leq 1.7$. In certain other embodiments, it is desired that $0.7 \leq CONAV(k)/CONAV(av) \leq 1.4$. In certain other embodiments, it is desired that $0.8 \leq CONAV(k)/CONAV(av) \leq 1.2$. In certain other embodiments, it is desired that $0.9 \leq CONAV(k)/CONAV(av) \leq 1.1$. In certain other embodiments, it is desired that $0.95 \leq CONAV(k)/CONAV(av) \leq 1.05$. In certain embodiments, for all CONAV(k) where $0.05p \leq k \leq 0.95p$: $0.5 \leq CONAV(k)/CONAV(av) \leq 2$; in certain embodiments, $0.6 \leq CONAV(k)/CONAV(av) \leq 1.7$. In certain other embodiments, it is desired that $0.7 \leq CONAV(k)/CONAV(av) \leq 1.4$. In certain other embodiments, it is desired that $0.8 \leq CONAV(k)/CONAV(av) \leq 1.2$. In certain other embodiments, it is desired that $0.9 \leq CONAV(k)/CONAV(av) \leq 1.1$. In certain other embodiments, it is desired that $0.95 \leq CONAV(k)/CONAV(av) \leq 1.05$.

In certain embodiments of the present invention, the additive is present on a majority of the wall surfaces of the microscale pores. In certain other embodiments of the present invention, the additive is present on at least 75% of the wall surfaces of the microscale pores. In certain other embodiments of the present invention, the additive is present on at least 90% of the wall surfaces of the microscale pores. In certain other embodiments of the present invention, the additive is present on at least 95% of the wall surfaces of the microscale pores.

In certain embodiments of the present invention, the additive is present on at least 20% of the wall surfaces of the nanoscale pores. In certain other embodiments of the present invention, the additive is present on at least 30% of the wall surfaces of the nanoscale pores. In certain other embodiments of the present invention, the additive is present on at least 40% of the wall surfaces of the nanoscale pores. In certain other embodiments of the present invention, the additive is present on at least 50% of the wall surfaces of the nanoscale pores. In certain other embodiments of the present invention, the additive is present on at least 75% of the wall surfaces of the nanoscale pores. In certain other embodiments of the present invention, the additive is present on at least 85% of the wall surfaces of the nanoscale pores. In certain embodiments of the present invention, a majority of the specific area of the sorbent body is provided by the wall surfaces of the nanoscale pores. In these embodiments, it is desired that a higher percentage of the wall surface of the nanoscale pores has the additive distributed thereon.

As indicated supra and infra, the sorbent body of the present invention may comprise inorganic filler material. In contrast to the additive, the inorganic filler is chemically and physically inert. As such, it does not function in one or more of the following ways to promote the removal of the toxic elements: (i) temporary or permanent chemical sorption (e.g., via covalent and/or ionic bonds) of a toxic element; (ii) temporary or permanent physical sorption of a toxic element; (iii) catalyzing the reaction/sorption of a toxic element with other components of the sorbent body; (iv) catalyzing the reaction of a toxic element with the ambient atmosphere to convert it from one form to another; (v) trapping a toxic element already sorbed by other components of the sorbent body; and (vi) facilitating the transfer of a toxic element to the active sorbing sites.

In order to obtain a high specific surface area of the sorbent body, it is even desired that, if inorganic fillers are included, such inorganic fillers in and of themselves are porous and contribute partly to the high specific area of the sorbent body. Nonetheless, as indicated supra, most of the high specific area of the sorbent body of the present invention are provided by the pores, especially the nanoscale pores, of the activate carbon matrix. Inorganic fillers having specific surface area comparable to that of the activated carbon is usually difficult or costly to be included in the sorbent body of the present invention. Therefore, along with the typical mechanical reinforcement such inorganic fillers would bring to the final sorbent body, it also tends to compromise the overall specific area of the sorbent body. This can be highly undesirable in some cases. As indicated supra, a high surface area of the sorbent body usually means more active sites (including carbon sites capable of sorption of the toxic elements, sulfur capable of promoting or direct sorption of the toxic elements, and the additive capable of promoting sorption of the toxic elements) for the sorption of the toxic elements. It is further believed that close proximity of the three categories of active sorption sites in the sorbent body is conducive to the overall sorption capability.

The incorporation of large amounts of inorganic fillers dilutes the additive and sulfur in the carbon matrix, adding to the overall average distances between and among these three categories of active sites. Hence, in some embodiments, the sorbent body of the present invention has a relative low percentage of inorganic filler (the remainder of the sorbent body being carbon, sulfur and additive). In certain embodiments of the sorbent body of the present invention, the sorbent body comprises less than 40%, less than 30%, less than 20%, less than 10%, less than 9%, less than 8%, less than 0.7%, less than 6%, less than 5%, less than 4%, less than 3%, less than 2%, less than 1%, or less than 0.5% by weight of inorganic filler. In one embodiment, the sorbent body of the present invention comprises no inorganic filler. Sorbent bodies in these embodiments, which comprise lesser amounts of inorganic fillers, can lead to a more uniform distribution of mercury capture throughout the cross-section of the walls of the activated carbon matrix.

The sorbent body of the present invention comprises sulfur. Sulfur may be present in the form of elemental sulfur (0 valency), sulfides (−2 valency, e.g.), sulfite (+4 valency, e.g.), sulfate (+6 valency, e.g.). It is desired that at least part of the sulfur is present in a valency capable of chemically bonding with the toxic element to be removed from the fluid stream. To that end, it is desired that at least part of the sulfur is present at −2 and/or zero valency. Part of sulfur may be chemically or physically bonded to the wall surface of the activated carbon matrix. Part of the sulfur may be chemically or physically bonded to the additive, as indicated supra, e.g., in the form of a sulfide (FeS, MnS, $Mo_2S_3$, CuS and the like). In certain embodiments, it is desired that at least 40% by mole of the sulfur in the sorbent body be at zero valency. In certain other embodiments, it is desired that at least 50% by mole of the sulfur in the sorbent body be at zero valency. In certain other embodiments, it is desired that at least 60% by mole of the sulfur in the sorbent body be at zero valency. In certain other embodiments, it is desired that at least 70% by mole of the sulfur in the sorbent body be at zero valency.

Experiments have demonstrated that sulfur-infused activated carbon can be effective for removing arsenic, cadmium as well as selenium, in addition to mercury, from a gas stream. Experiments have demonstrated that sorbent bodies comprising elemental sulfur tend to have higher mercury removal capability than those without elemental sulfur but with essentially the same total sulfur concentration.

The amount of sulfur present in the sorbent bodies of the present invention can be selected, depending on the particular additive used, and application for which the sorbent bodies are used, and the desired toxic element removing capacity and efficiency of sorbent body. In certain embodiments of the sorbent bodies of the present invention, the amount of the sulfur ranges from 1 to 20% by weight, in certain embodiments from 1 to 15%, in certain other embodiments from 2% to 10%, in certain other embodiments from 3% to 8%.

In certain embodiments of the present invention, sulfur is distributed throughout the activated carbon matrix. By "distributed throughout the activated carbon matrix" is meant that sulfur is present not just on the external surface of the sorbent body or cell walls, but also deep inside the sorbent body. Thus the presence of sulfur can be, e.g.: (i) on the wall surfaces of nanoscale pores; (ii) on the wall surfaces of microscale pores; (iii) submerged in the wall structure of the activated carbon matrix; and (iv) partly embedded in the wall structure of the activated carbon matrix. In situations (iii) and (iv), sulfur actually forms part of the wall structure of the pores of the sorbent body. Therefore, in certain embodiments, some of sulfur may be chemically bonded with other components of the sorbent body, such as carbon or the additive. In certain other embodiments, some of the sulfur may be physically bonded with the activated carbon matrix or other components. Still in certain other embodiments, some of the sulfur is present in the sorbent body in the form of particles having nanoscale or microscale size.

Distribution of sulfur in the sorbent body or other body or material according to the present invention can be measured and characterized by the Distribution Characterization Method described supra.

In certain embodiments, the distribution of sulfur in any target test area has the following feature: $CON(max)/CON(min) \geq 100$. In certain other embodiments: $CON(max)/CON(min) \geq 200$. In certain other embodiments: $CON(max)/CON(min) \geq 300$. In certain other embodiments: $CON(max)/CON(min) \geq 400$. In certain other embodiments: $CON(max)/CON(min) \geq 500$. In certain other embodiments: $CON(max)/CON(min) \geq 1000$. In certain other embodiments: $CON(max)/CON(av) \geq 50$. In certain other embodiments: $CON(max)/CON(av) \geq 100$. In certain other embodiments: $CON(max)/CON(av) \geq 200$. In certain other embodiments: $CON(max)/CON(av) \geq 300$. In certain other embodiments: $CON(max)/CON(av) \geq 400$. In certain other embodiments: $CON(max)/CON(av) \geq 500$. In certain other embodiments: $CON(max)/CON(av) \geq 1000$.

In certain embodiments of the sorbent body of the present invention, with regard to sulfur distributed in the sorbent body, the distribution thereof in all p target test areas has the following feature:
$CONAV(1)/CONAV(n) \geq 2$. In certain other embodiments: $CONAV(1)/CONAV(n) \geq 5$. In certain other embodiments: $CONAV(1)/CONAV(n) \geq 8$. In certain other embodiments: $CONAV(1)/CONAV(n) \geq 1.5$. In certain other embodiments: $CONAV(1)/CONAV(av) \geq 2$. In certain other embodiments: $CONAV(1)/CONAV(av) \geq 3$. In certain other embodiments: $CONAV(1)/CONAV(av) \geq 4$. In certain other embodiments: $CONAV(1)/CONAV(av) \geq 5$. In certain other embodiments: $CONAV(1)/CONAV(av) \geq 8$. In certain other embodiments: $CONAV(1)/CONAV(av) \geq 10$.

In certain other embodiments of the sorbent body of the present invention, with regard to sulfur distributed in the sorbent body, in each target test area, the distribution thereof has the following feature: $CON(av)/CON(min) \leq 30$. In certain other embodiments: $CON(av)/CON(min) \leq 20$. In certain other embodiments: $CON(av)/CON(min) \leq 15$. In certain other embodiments: $CON(av)/CON(min) \leq 10$. In certain other embodiments: $CON(av)/CON(min) \leq 5$. In certain other embodiments: $CON(av)/CON(min) \leq 3$. In certain other embodiments: $CON(av)/CON(min) \leq 2$. In certain other embodiments: $CON(max)/CON(av) \leq 30$. In certain other embodiments: $CON(max)/CON(av) \leq 20$. In certain other embodiments: $CON(max)/CON(av) \leq 15$. In certain other embodiments: $CON(max)/CON(av) \leq 10$. In certain other embodiments: $CON(max)/CON(av) \leq 5$. In certain other embodiments: $CON(max)/CON(av) \leq 3$. In certain other embodiments: $CON(max)/CON(av) \leq 2$.

In certain embodiments of the sorbent body of the present invention, the distribution of sulfur has the following feature: in each target test area, $CON(av)/CON(min) \leq 30$, and $CON(max)/CON(av) \leq 30$. In certain other embodiments, it is desired that $CON(av)/CON(min) \leq 20$, and $CON(max)/CON(av) \leq 20$. In certain other embodiments, it is desired that $CON(av)/CON(min) \leq 15$, and $CON(max)/CON(av) \leq 15$. In certain other embodiments, it is desired that $CON(av)/CON(min) \leq 10$, and $CON(max)/CON(av) \leq 10$. In certain other embodiments, it is desired that $CON(av)/CON(min) \leq 5$, and $CON(max)/CON(av) \leq 5$. In certain other embodiments, it is desired that $CON(av)/CON(min) \leq 3$, and $CON(max)/CON(av) \leq 3$. In certain other embodiments, it is desired that $CON(av)/CON(min) \leq 2$, and $CON(max)/CON(av) \leq 2$.

In certain embodiments of the sorbent body of the present invention, sulfur is homogeneously distributed throughout the activated carbon matrix according to the Distribution Characterization Method described supra. Thus: in each target test area, for all $CON(m)$ where $0.1n \leq m \leq 0.9n$: $0.5 \leq CON(m)/CON(av) \leq 2$.

In certain embodiments, it is desired that $0.6 \leq CON(m)/CON(av) \leq 1.7$. In certain other embodiments, it is desired that $0.7 \leq CON(m)/CON(av) \leq 1.4$. In certain other embodiments, it is desired that $0.8 \leq CON(m)/CON(av) \leq 1.2$. In certain other embodiments, it is desired that $0.9 \leq CON(m)/CON(av) \leq 1.1$. In certain embodiments, for all $CON(m)$ where $0.05n \leq m \leq 0.95n$: $0.5 \leq CON(m)/CON(av) \leq 2$; in certain embodiments, $0.6 \leq CON(m)/CON(av) \leq 1.7$. In certain other embodiments, it is desired that $0.7 \leq CON(m)/CON(av) \leq 1.4$. In certain other embodiments, it is desired that $0.8 \leq CON(m)/CON(av) \leq 1.2$. In certain other embodiments, it is desired that $0.9 \leq CON(m)/CON(av) \leq 1.1$. In certain embodiments of the bodies (sorbent body, extrusion mixture body, and the like) and material of the present invention, in addition to any one of the features stated above in this paragraph with respect to each individual target test area, the distribution of the relevant material (e.g., sulfur, an additive, and the like) with respect to all p target test areas has the following feature: for all $CONAV(k)$ where $0.1p \leq k \leq 0.9p$: $0.5 \leq CONAV(k)/CONAV(av) \leq 2$; in certain embodiments, $0.6 \leq CONAV(k)/CONAV(av) \leq 1.7$. In certain other embodiments, it is desired that $0.7 \leq CONAV(k)/CONAV(av) \leq 1.4$. In certain other embodiments, it is desired that $0.8 \leq CONAV(k)/CONAV(av) \leq 1.2$. In certain other embodiments, it is desired that $0.9 \leq CONAV(k)/CONAV(av) \leq 1.1$. In certain other embodiments, it is desired that $0.95 \leq CONAV(k)/CONAV(av) \leq 1.05$. In certain embodiments, for all $CONAV(k)$ where $0.05p \leq k \leq 0.95p$: $0.5 \leq CONAV(k)/CONAV(av) \leq 2$; in certain embodiments, $0.6 \leq CONAV(k)/CONAV(av) \leq 1.7$. In certain other embodiments, it is desired that $0.7 \leq CONAV(k)/CONAV(av) \leq 1.4$. In certain other embodiments, it is desired that $0.8 \leq CONAV(k)/CONAV(av) \leq 1.2$. In certain other embodiments, it is desired that $0.9 \leq CONAV(k)/CONAV(av) \leq 1.1$. In certain other embodiments, it is desired that $0.95 \leq CONAV(k)/CONAV(av) \leq 1.05$.

In certain embodiments of the present invention, sulfur is present on a majority of the wall surfaces of the microscale pores. In certain other embodiments of the present invention, sulfur is present on at least 75% of the wall surfaces of the microscale pores. In certain other embodiments of the present invention, sulfur is present on at least 90% of the wall surfaces of the microscale pores. In certain other embodiments of the present invention, sulfur is present on at least 95% of the wall surfaces of the microscale pores.

In certain embodiments of the present invention, sulfur is present on at least 20% of the wall surfaces of the nanoscale pores. In certain other embodiments of the present invention, sulfur is present on at least 30% of the wall surfaces of the nanoscale pores. In certain other embodiments of the present invention, sulfur is present on at least 40% of the wall surfaces of the nanoscale pores. In certain other embodiments of the present invention, sulfur is present on at least 50% of the wall surfaces of the nanoscale pores. In certain other embodiments of the present invention, sulfur is present on at least 75% of the wall surfaces of the nanoscale pores. In certain other embodiments of the present invention, sulfur is present on at least 85% of the wall surfaces of the nanoscale pores. In certain embodiments of the present invention, a majority of the specific area of the sorbent body is provided by the wall surfaces of the nanoscale pores. In these embodiments, it is desired that a high percentage (such as at least 40%, in certain embodiments at least 50%, in certain other embodiments at least 60%) of the wall surface of the nanoscale pores has sulfur distributed thereon.

In certain embodiments of the present invention, in addition to activated carbon, sulfur and the additive, the sorbent body may further comprise an inorganic filler. Such inorganic fillers may be included for the purpose of, inter alia, reducing cost, and improving physical (coefficient of thermal expansion; modulus of rupture, e.g.); or chemical properties (water resistance; high temperature resistance; corrosion-resistance, e.g.) of the sorbent body. Such inorganic filler can be an oxide glass, oxide ceramic, or certain refractory materials. Non-limiting examples of inorganic fillers that may be included in the sorbent body of the present invention include: silica; alumina; zircon; zirconia; mullite; cordierite; refractory metals; and the like. In certain embodiments of the sorbent body of the present invention, the inorganic fillers are per se porous. A high porosity of the inorganic fillers can improve the mechanical strength of the sorbent body without unduly sacrificing the specific area. The inorganic filler may be distributed throughout the sorbent body. The inorganic filler may be present in the form of minuscule particles distributed in the sorbent body. Depending on the application of the sorbent body and other factors, in certain embodiments, the sorbent body may comprise, e.g., up to 50% by weight of inorganic filler, in certain other embodiments up to 40%, in certain other embodiments up to 30%, in certain other embodiments up to 20%, in certain other embodiments up to 10%.

In certain embodiments, the sorbent body of the present invention comprises at least 90% by weight (in certain embodiments at least 95%, in certain other embodiments at least 98%) of activated carbon, sulfur and the additive.

It is believed that the sorbent material of the present invention is capable of removing arsenic, cadmium, mercury and selenium from a syngas stream produced during a coal gasification process. It has been found that the sorbent body of the present invention is particularly effective in removing mercury from a flue gas stream. The removal capabilities of the sorbent materials with respect to a certain toxic element, e.g., mercury, are typically characterized by two parameters: initial removal efficiency and long term removal capacity. With respect to mercury, the following procedure is to be used to characterize the initial mercury removal efficiency and long term mercury removal capacity:

The sorbent body to be tested is loaded into a fixed bed through which a reference flue gas at 160° C. having a specific composition is passed at a space velocity of 7500 hr$^{-1}$. Concentrations of mercury in the gas stream are measured before and after the sorbent bed. At any given time, the instant mercury removal efficiency (Eff(Hg)) is calculated as follows:

$$Eff(Hg) = \frac{C_0 - C_1}{C_0} \times 100\%,$$

where $C_0$ is the total mercury concentration in $\mu g \cdot m^{-3}$ in the flue gas stream immediately before the sorbent bed, and $C_1$ is the total mercury concentration in $\mu g \cdot m^{-3}$ immediately after the sorbent bed. Initial mercury removal efficiency is defined as the average mercury removal efficiency during the first 1 (one) hour of test after the fresh test sorbent material is loaded. Typically, the mercury removal efficiency of a fixed sorbent bed diminishes over time as the sorbent bed is loaded with more and more mercury. Mercury removal capacity is defined as the total amount of mercury trapped by the sorbent bed per unit mass of the sorbent body material until the instant mercury removal efficiency diminishes to 90% under the above testing conditions. Mercury removal capacity is typically expressed in terms of mg of mercury trapped per gram of the sorbent material (mg·g$^{-1}$).

An exemplary test reference flue gas (referenced as RFG1 herein) has the following composition by volume: $O_2$ 5%; $CO_2$ 14%; $SO_2$ 1500 ppm; NOx 300 ppm; HCl 100 ppm; Hg 20-25 $\mu g \cdot m^{-3}$; $N_2$ balance; wherein NOx is a combination of $NO_2$, $N_2O$ and NO; Hg is a combination of elemental mercury (Hg(0), 50-60% by mole) and oxidized mercury (40-50% by mole). In certain embodiments of the present invention, the sorbent body of the present invention has an initial mercury removal efficiency with respect to RFG1 of at least 91%, in certain embodiments at least 92%, in certain other embodiments at least 95%, in certain other embodiments at least 97%, in certain other embodiments at least 98%, in certain other embodiments at least 99%, in certain other embodiments at least 99.5%.

In certain embodiments of the present invention, the sorbent material advantageously has a high initial mercury removal efficiency of at least 91% for flue gases comprising $O_2$ 5%; $CO_2$ 14%; $SO_2$ 1500 ppm; $NO_x$ 300 ppm; Hg 20-25 $\mu g \cdot m^{-3}$, having high concentrations of HCl and low concentrations of HCl alike. By "high concentrations of HCl" is meant that HCl concentration in the gas to be treated is at least 20 ppm. By "low concentration of HCl" is meant that HCl concentration in the gas to be treated is at most 10 ppm. The sorbent body of certain embodiments of the present invention advantageously has a high initial mercury removal efficiency of at least 91% (in certain embodiments at least 93%, in certain embodiments at least 95%, in certain embodiments at least 96%, in certain embodiments at least 98%, in certain embodiments at least 99%, in certain other embodiments at least 99.5%) for a flue gas (referred to as RFG2) having the following composition: $O_2$ 5%; $CO_2$ 14%; $SO_2$ 1500 ppm; $NO_x$ 300 ppm; HCl 5 ppm; Hg 20-25 $\mu g \cdot m^{-3}$; $N_2$ balance. High mercury removal efficiency of these embodiments of the sorbent material of the present invention for low HCl flue gas is particularly advantageous compared to the prior art. In the prior art processes involving the injection of activated carbon powder, it is typically required that HCl be added to the flue gas in order to obtain a decent initial mercury removal efficiency. The embodiments of the present invention presenting high mercury efficiency at low HCl concentration allows for the efficient and effective removal of mercury from a flue gas stream without the need of injecting HCl into the gas stream.

In certain embodiments of the present invention, the sorbent material advantageously has a high initial mercury removal efficiency of at least 91% for flue gases comprising $O_2$ 5%; $CO_2$ 14%; $SO_2$ 1500 ppm; $NO_x$ 300 ppm; Hg 20-25 $\mu g \cdot m^{-1}$, having high concentrations of $SO_3$ (such as 5 ppm, 8 ppm, 10 ppm, 15 ppm, 20 ppm, 30 ppm) and low concentrations of $SO_3$ alike (such as 0.01 ppm, 0.1 ppm, 0.5 ppm, 1 ppm, 2 ppm). By "high concentrations of $SO_3$" is meant that $SO_3$ concentration in the gas to be treated is at least 3 ppm by volume. By "low concentration of $SO_3$" is meant that $SO_3$ concentration in the gas to be treated is less than 3 ppm. The sorbent body of certain embodiments of the present invention advantageously has a high initial mercury removal efficiency of at least 91% (in certain embodiments at least 95%, in certain other embodiments at least 98%) for a flue gas (referred to as RFG3) having the following composition: $O_2$ 5%; $CO_2$ 14%; $SO_2$ 1500 ppm; $NO_x$ 300 ppm; $SO_3$ 5 ppm; Hg 20-25 $\mu g \cdot m^{-3}$; $N_2$ balance. High mercury removal efficiency of certain embodiments of the sorbent body of the present invention for high $SO_3$ flue gas is particularly advantageous compared to the prior art. In the prior art processes involving the injection of activated carbon powder, it is typically required that $SO_3$ be removed from the flue gas in order to obtain a decent initial mercury removal efficiency. The embodiments of the present invention presenting high mercury efficiency at high $SO_3$ concentration allows for the efficient and effective removal of mercury from a flue gas stream without the need of prior removal of $SO_3$ from the gas stream.

Moreover, in certain embodiments of the present invention, the sorbent material advantageously has a high mercury removal capacity with respect to RFG1 of at least 0.10 mg·g$^{-1}$, in certain embodiments at least 0.20 mg·g$^{-1}$, in certain embodiments at least 0.25 mg·g$^{-1}$, in certain embodiments at least 0.30 mg·g$^{-1}$.

Moreover, in certain embodiments of the present invention, the sorbent material advantageously has a high mercury removal capacity with respect to RFG2 of at least 0.10 mg·g$^{-1}$, in certain other embodiments at least 0.20 mg·g$^{-1}$, in certain other embodiments at least 0.25 mg·g$^{-1}$, in certain other embodiments at least 0.30 mg·g$^{-1}$. Thus, the sorbent bodies according to these embodiments have a high mercury removal capacity with respect to low HCl flue gas streams. This is particularly advantageous compared to prior art mercury abatement processes.

Moreover, in certain embodiments of the present invention, the sorbent material advantageously has a high mercury removal capacity of at least 0.20 mg·g$^{-1}$, in certain embodiments at least 0.25 mg·g$^{-1}$, in certain embodiments at least 0.30 mg·g$^{-1}$, with respect to RFG3. Thus, the sorbent bodies according to these embodiments have a high mercury removal capacity with respect to high $SO_3$ flue gas streams. This is particularly advantageous compared to the prior art mercury abatement processes.

Another aspect of the present invention is the use of the sorbent material of the present invention in a process for treating fluid streams, including gas streams and fluid streams comprising toxic elements and/or compounds, such as arsenic, cadmium, mercury and/or selenium, for abating them. Such process typically comprises a step of placing the sorbent body of the present invention in the fluid stream. Such treatment process is particularly advantageous for abating mercury from the fluid stream.

Due to the removal ability of elemental mercury from the fluid stream of the sorbent body of certain embodiments of the present invention, a particularly advantageous embodiment of the process comprises placing the sorbent body in a gas stream comprising mercury wherein at least 10% by mole of the mercury is in elemental state. In certain embodiments, at least 20% of the mercury contained in the gas stream is in elemental state, in certain other embodiments at least 30%, in certain other embodiments at least 40%, in certain other embodiments at least 50%, in certain other embodiments at least 60%, in certain other embodiments at least 70%.

Due to the removal ability of mercury from the fluid stream of the sorbent body of certain embodiments of the present invention, even if the gas stream comprises HCl at a very low level, a particularly advantageous embodiment of the process comprises placing the sorbent body in a gas stream comprising mercury and HCl at a HCl concentration of lower than 50 ppm by volume, in certain embodiments lower than 40 ppm, in certain embodiments lower than 30 ppm, in certain other embodiments lower than 20 ppm, in certain other embodiments lower than 10 ppm.

Due to the removal ability of mercury from the fluid stream of the sorbent body of certain embodiments of the present invention, even if the gas stream comprises $SO_3$ at a high level, a particularly advantageous embodiment of the process comprises placing the sorbent body in a gas stream comprising mercury and $SO_3$ at a $SO_3$ concentration higher than 3 ppm by volume, in certain embodiments higher than 5 ppm, in certain other embodiments higher than 8 ppm, in certain other embodiments higher than 10 ppm, in certain other embodiments higher than 20 ppm.

A third aspect of the present invention is directed to the process for making the sorbent body of the present invention. In general, the process comprises the following steps:

(A) providing a batch mixture body formed of a batch mixture material comprising a carbon-source material, a sulfur-source material, an additive-source material and an optional filler material, wherein the additive-source material is substantially homogeneously distributed in the batch mixture material;

(B) carbonizing the batch mixture body by subjecting the batch mixture body to an elevated carbonizing temperature in an $O_2$-depleted atmosphere to obtain a carbonized batch mixture body;

(C) activating the carbonized batch mixture body at an elevated activating temperature in a $CO_2$ and/or $H_2O$-containing atmosphere.

In certain embodiments, the carbon-source material comprises: synthetic carbon-containing polymeric material; activated carbon powder; charcoal powder; coal tar pitch; petroleum pitch; wood flour; cellulose and derivatives thereof; natural organic materials such as wheat flour; wood flour, corn flour, nut-shell flour; starch; coke; coal; or mixtures or combinations of any two or more of these. All these materials contain certain components comprising carbon atoms in its structure units on a molecular level that can be at least partly retained in the final activated carbon matrix of the sorbent body of the present invention.

In one embodiment, the synthetic polymeric material can be a synthetic resin in the form of a solution or low viscosity liquid at ambient temperatures. Alternatively, the synthetic polymeric material can be a solid at ambient temperature and capable of being liquefied by heating or other means. Examples of useful polymeric carbon-source materials include thermosetting resins and thermoplastic resins (e.g., polyvinylidene chloride, polyvinyl chloride, polyvinyl alcohol, and the like). Still further, in one embodiment, relatively low viscosity carbon precursors (e.g., thermosetting resins) can be preferred, having exemplary viscosity ranges from about 50 to 100 cps. In another embodiment, any high carbon yield resin can be used. To this end, by high carbon yield is meant that greater than about 10% of the starting weight of the resin is converted to carbon on carbonization. In another embodiment, the synthetic polymeric material can comprise a phenolic resin or a furfural alcohol based resin such as furan resins. Phenolic resins can again be preferred due to their low viscosity, high carbon yield, high degree of cross-linking upon curing relative to other precursors, and low cost. Exemplary suitable phenolic resins are resole resin such as plyophen resin. An exemplary suitable furan liquid resin is Furcab-LP from QO Chemicals Inc., IN, U.S.A. An exemplary solid resin well suited for use as a synthetic carbon precursor in the present invention is solid phenolic resin or novolak. Still further, it should be understood that mixtures of novolak and one or more resole resins can also be used as suitable polymeric carbon-source material. The phenolic resin may be pre-cured or uncured when mixed with other material to form the batch mixture material. Where the phenolic resin is pre-cured, the pre-cured material may comprise sulfur, additive or the optional inorganic filler pre-loaded. As indicated infra, in certain embodiments, it is desired that a curable, uncured resin is included as part of the carbon-source material in the batch mixture material. Curable materials, thermoplastic or thermosetting, undergo certain reactions, such as chain propagation, crosslinking, and the like, to form a cured material with higher degree of polymerization when being subjected to cure conditions, such as mild heat treatment, irradiation, chemical activation, and the like.

In certain embodiments of the present invention, organic binders typically used in extrusion and/or injection molding processes can be part of the carbon-source material as well. Exemplary binders that can be used are plasticizing organic binders such as cellulose ethers. Typical cellulose ethers include methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Further, cellulose ethers such as methylcellulose and/or methylcellulose derivatives are especially suited as organic binders in the practice of the present invention, with methylcellulose, hydroxypropyl methylcellulose, or combinations of these being preferred. An example methylcellulose binder is METHOCEL A, sold by the Dow Chemical Company. Example hydroxypropyl methylcellulose binders include METHOCEL E, F, J, K, also sold by the Dow Chemical Company. Binders in the METHCEL 310 Series, also sold by the Dow Chemical Company, can also be used in the context of the invention. METHOCEL A4M is an example binder for use with a RAM extruder. METHOCEL F240C is an example binder for use with a twin screw extruder.

Carbonizable organic fillers may be used as part of the carbon-source material in certain embodiments of the process of the present invention. Exemplary carbonizable fillers include both natural and synthetic, hydrophobic and hydrophilic, fibrous and non-fibrous fillers. For example some natural fillers are soft woods, e.g., pine, spruce, redwood, etc.; hardwoods, e.g., ash, beech, birch, maple, oak, etc.; sawdust, shell fibers, e.g., ground almond shell, coconut shell, apricot pit shell, peanut shell, pecan shell, walnut shell, etc.; cotton fibers, e.g., cotton flock, cotton fabric, cellulose fibers, cotton seed fiber; chopped vegetable fibers, for example, hemp, coconut fiber, jute, sisal, and other materials such as corn cobs, citrus pulp (dried), soybean meal, peat moss, wheat flour, wool fibers, corn, potato, rice, tapiocas, etc. Some synthetic materials are regenerated cellulose, rayon fabric, cellophane, etc. One especially suited carbonizable fiber filler is cellulose fiber as supplied by International Filler Corporation, North Tonawanda, N.Y. This material has the following sieve analysis: 1-2% on 40 mesh (420 micrometers), 90-95% thru 100 mesh (149 micrometers), and 55-60% thru 200 mesh (74 micrometers). Some hydrophobic organic synthetic fillers are polyacrylonitrile fibers, polyester fibers (flock), nylon fibers, polypropylene fibers (flock) or powder, acrylic fibers or powder, aramid fibers, polyvinyl alcohol, etc. Such organic fiberous fillers may function in part as part of the carbon-source material, in part as mechanical property enhancer to the batch mixture body, and in part as pore-forming agents that would mostly vaporize upon carbonization.

Non-limiting examples of additive-source material include: alkali and alkaline earth halides, oxides and hydroxides; oxides, sulfides, and salts of vanadium, chromium, manganese, iron, cobalt, nickel, copper, zinc, niobium, molybdenum, silver, tungsten, and lanthanoids. The metallic elements in the additive-source materials can be at various valencies. For example, if iron is included in the additive-source material, it may be present at +3, +2 or 0 valencies or as mixtures of differing valencies, and can be present as metallic iron (0), FeO, $Fe_2O_3$, $Fe_3O_8$, FeS, $FeCl_2$, $FeCl_3$, $FeSO_4$, and the like. For another example, if manganese is present in the additive, it may be present at +4, +2 or 0 valencies or mixtures of differing valences, and can be present as metallic manganese (0), MnO, $MnO_2$, MnS, $MnCl_2$, $MnCl_4$, $MnSO_4$, and the like.

Non-limiting examples of sulfur-source material include: sulfur powder; sulfur-containing powdered resin; sulfides; sulfates; and other sulfur-containing compounds; or mixtures or combination of any two or more of these. Exemplary sulfur-containing compounds can include hydrogen sulfide and/or its salts, carbon disulfide, sulfur dioxide, thiophene, sulfur anhydride, sulfur halides, sulfuric ester, sulfurous acid, sulfacid, sulfatol, sulfamic acid, sulfan, sulfanes, sulfuric acid and its salts, sulfite, sulfoacid, sulfobenzide, and mixtures thereof. When elemental sulfur powder is used, in one embodiment it can be preferred to have an average particle diameter that does not exceed about 100 micrometers. Still further, it is preferred in certain embodiments that the elemental sulfur powder has an average particle diameter that does not exceed about 10 micrometers.

Inorganic fillers are not required to be present in the batch mixture material. However, if present, the filler material can be, e.g.: oxide glass; oxide ceramics; or other refractory materials. Exemplary inorganic fillers that can be used include oxygen-containing minerals or salts thereof, such as clays, zeolites, talc, etc., carbonates, such as calcium carbonate, alumninosilicates such as kaolin (an aluminosilicate clay), flyash (an aluminosilicate ash obtained after coal firing in power plants), silicates, e.g., wollastonite (calcium metasilicate), titanates, zirconates, zirconia, zirconia spinel, magnesium aluminum silicates, mullite, alumina, alumina trihydrate, boehmite, spinel, feldspar, attapulgites, and aluminosilicate fibers, cordierite powder, etc. Some examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2-6 micrometers in diameter and about 20-50 micrometers in length. Additional examples of inorganic fillers are various carbides, such as silicon carbide, titanium carbide, aluminum carbide, zirconium carbide, boron carbide, and aluminum titanium carbide; carbonates or carbonate-bearing minerals such as baking soda, nahcolite, calcite, hanksite and liottite; and nitrides such as silicon nitride.

The batch mixture material may also optionally comprise forming aids. Exemplary forming aids can include soaps, fatty acids, such as oleic, linoleic acid, etc., polyoxyethylene stearate, etc. or combinations thereof. In one embodiment, sodium stearate is a preferred forming aid. Optimized amounts of the optional extrusion aid(s) will depend on the composition and binder. Other additives that are useful for improving the extrusion and curing characteristics of the batch are phosphoric acid and oil. Phosphoric acid improves the cure rate and increases adsorption capacity. If included, it is typically about 0.1% to 5 wt % in the batch mixture material. Still further, an oil addition can aid in extrusion and can result in increases in surface area and porosity. To this end, an optional oil can be added in an amount in the range from about 0.1 to 5 wt. % of the batch mixture material. Exemplary oils that can be used include petroleum oils with molecular weights from about 250 to 1000, containing paraffinic and/or aromatic and/or alicyclic compounds. So called paraffinic oils composed primarily of paraffinic and alicyclic structures are preferred. These can contain additives such as rust inhibitors or oxidation inhibitors such as are commonly present in commercially available oils. Some useful oils are 3 in 1 oil from 3M Co., or 3 in 1 household oil from Reckitt and Coleman Inc., Wayne, N.J. Other useful oils can include synthetic oils based on poly (alpha olefins), esters, polyalkylene glycols, polybutenes, silicones, polyphenyl ether, CTFE oils, and other commercially available oils. Vegetable oils such as sunflower oil, sesame oil, peanut oil, soyabean oil etc. are also useful. Especially suited are oils having a viscosity of about 10 to 300 cps, and preferably about 10 to 150 cps.

The batch mixture material may also optionally comprise natural and/or synthetic pore-forming agents. The pore-forming agents may then be removed, for example, before or during carbonization and/or activation of the sorbent body. Removal of the pore-forming agents can impart certain characteristics to the pore structure of the sorbent body, such as voids of various sizes and dimensions.

In one embodiment, exemplary pore forming agents can include natural or synthetic pore-forming agents that, upon carbonization of the sorbent body, burn out and leave little or no residue behind in the sorbent body. Examples of such pore-forming agents include polymeric materials, such as polymeric beads. Example polymeric materials, such as polymeric beads, include polypropylene and polyethylene materials and beads. In one embodiment, the batch mixture material may comprise, as a pore-forming agent, polypropylene, polyester or acrylic powders or fibers that decompose in inert atmosphere at high temperature (>400° C.) to leave little or no residue.

Additional pore-forming agents include natural and synthetic starches. In some embodiments, when the pore-forming agent is water soluble, such as a starch, the pore-forming agent may be removed after curing the sorbent body via water dissolution before carbonization. In another embodiment, a suitable pore-forming agent can form macropores due to particle expansion. For example, intercalated graphite, which contains an acid such as hydrochloric acid, sulfuric acid or nitric acid, will form macropores when heated, due to the resulting expansion of the acid. Still further, macropores can also be formed by dissolving certain fugitive materials. For example, baking soda, calcium carbonate or limestone particles having a particle size corresponding to desired pore size can be extruded with carbonaceous materials to form monolithic sorbents. Baking soda, calcium carbonate or limestone forms water soluble oxides during the carbonization and activation processes, which can subsequently be leached to form macropores by soaking the monolithic sorbent in water.

In order to obtain a distribution of an additive throughout the final sorbent body, it is highly desired that the carbon-source materials and the additive-source materials are intimately mixed to form the batch mixture material. To that end, it is desired in certain embodiments that the various source materials are provided in the form of fine powders, or solutions if possible, and then mixed intimately by using an effective mixing equipment. When powders are used, they are provided in certain embodiments with average size not larger than 100 µm, in certain other embodiments not larger than 10 µm, in certain other embodiments not larger than 1 µm.

Various equipment and processes may be used to form the batch mixture material into a desired shape of the batch mixture body. For example, extrusion, injection molding (include reactive injection molding), compression molding, casting, pressing, or rapid prototyping may be used to shape the batch mixture body. The body may be cured as it is being shaped, for example, when shaped by injection molding or compression molding. Alternatively, the body may be cured after it is shaped, for example, when shaped by extrusion, casting, or rapid prototyping.

Extrusion is especially preferred in certain embodiments for forming the batch mixture material into a desired shape of the batch mixture body. Extrusion can be done by using standard extruders (ram extruder, single-screw, double-screw, and the like) and custom extrusion dies, to make sorbent bodies with various shapes and geometries, such as honeycombs, pellets, rods, spaghetti, and the like. Extrusion is particularly effective for making monolithic honeycomb bodies having a plurality of empty channels that can serve as fluid passageways. Extrusion is advantageous in that it can achieve a highly intimate mixing of all the source materials as well during the extrusion process.

Molds of various shapes and dimensions may also be used for shaping the batch material through injection molding, compression molding and casting all of which are well-known shaping techniques. Rapid prototyping, the automatic construction of physical objects using solid freeform fabrication, may also be used to shape the batch material. One advantage of rapid prototyping is that it may be used to create virtually almost any shape or geometric feature. Rapid prototyping comprises obtaining a virtual design, for example a computer aided design, converting the design into virtual thin horizontal cross sections, then creating each cross section of the design in physical space, one after the next, until the shape is completed. In the context of the present invention, an embodiment includes obtaining a virtual design of a shaped batch material, converting the design into virtual thin horizontal cross sections, and creating each cross section in physical space from the batch material. One example of rapid prototyping is 3D printing.

In certain embodiments of the present invention, it is desired that the batch mixture material comprises an uncured curable material. In those embodiments, upon forming of the batch mixture body, the sorbent body is typically subjected to a curing condition, e.g., heat treatment, such that the curable component cures, and a cured batch mixture body forms as a result. The cured batch mixture body tends to have better mechanical properties than its non-cured predecessor, and thus handles better in down-stream processing steps. Moreover, without the intention or necessity to be bound by any particular theory, it is believed that the curing step can result in a polymer network having a carbon backbone, which can be conducive to the formation of carbon network during the subsequent carbonization and activation steps. In certain embodiments the curing is generally performed in air at atmospheric pressures and typically by heating the formed batch mixture body at a temperature of from 70° C. to 200° C. for about 0.5 to about 5.0 hours. In certain embodiments, the batch mixture body is heated from a low temperature to a higher temperature in stages, for example, from 70° C., to 90° C., to 125° C., to 150° C., each temperature being held for a period of time. Alternatively, when using certain precursors, (e.g., furfuryl alcohol or furan resins) curing can also be accomplished by adding a curing additive such as an acid additive at room temperature. The curing can, in one embodiment, serve to retain the uniformity of the toxic metal adsorbing additive distribution in the carbon.

After formation of the batch mixture body, drying thereof, or optional curing thereof, the shaped body is subjected to a carbonization step, wherein the batch mixture body (cured or uncured) is heated to an elevated carbonizing temperature in an $O_2$-depleted atmosphere. The carbonization temperature can range from 600 to 1200° C., in certain embodiments from 700 to 1000° C. The carbonizing atmosphere can be inert, comprising mainly a non reactive gas, such as $N_2$, Ne, Ar, mixtures thereof, and the like. At the carbonizing temperature in an $O_2$-depleted atmosphere, the organic substances contained in the batch mixture body decompose to leave a carbonaceous residue. As can be expected, complex chemical reactions take place in this high-temperature step. Such reactions can include, inter alia:

(i) decomposition of the carbon-source materials to leave a carbonaceous body;

(ii) decomposition of the additive-source materials;

(iii) decomposition of the sulfur-source materials;

(iv) reactions between the sulfur-source materials and the carbon-source materials;

(v) reactions between the sulfur-source materials and carbon;

(vi) reactions between the sulfur-source materials and additive-source materials;

(vii) reactions between the additive-source materials and carbon-source materials; and (viii) reactions between the additive-source materials and carbon.

The net effect can include, inter alia: (1) re-distribution of the additive-source material and/or the additive; (2) re-distribution of sulfur; (3) formation of elemental sulfur from the sulfur-source material (such as sulfates, sulfites, and the like); (4) formation of sulfur-containing compounds from the sulfur-source material (such as elemental sulfur); (5) formation of additive in oxide form; (6) formation of additive in sulfide form; (7) reduction of part of the additive-source materials. Part of the sulfur (especially those in elemental state), and part of the additive-source material (such as KI) may be swept away by the carbonization atmosphere during carbonization.

The result of the carbonization step is a carbonaceous body with sulfur and additive distributed therein. However, this carbonized batch mixture body typically does not have the desired specific surface area for an effective sorption of toxic elements. To obtain the final sorbent body with a high specific surface area, the carbonized batch mixture body is further activated at an elevated activating temperature in a $CO_2$ and/or $H_2O$-containing atmosphere. The atmosphere may be essentially pure $CO_2$ or $H_2O$ (steam), a mixture of $CO_2$ and $H_2O$, or a combination of $CO_2$ and/or $H_2O$ with an inert gas such as nitrogen and/or argon. Utilizing a combination of nitrogen and $CO_2$, for example, may result in cost savings. A $CO_2$ and nitrogen mixture may be used, for example, with $CO_2$ content as low as 2% or more. Typically a mixture of $CO_2$ and nitrogen with a $CO_2$ content of 5-50% may be used to reduce process costs. The activating temperature can range from 600° C. to 1000° C., in certain embodiments from 600° C. to 900° C. During this step, part of the carbonaceous structure of the carbonized batch mixture body is mildly oxidized:

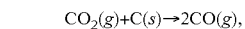

$$CO_2(g)+C(s) \rightarrow 2CO(g),$$

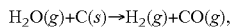

$$H_2O(g)+C(s) \rightarrow H_2(g)+CO(g),$$

resulting in the etching of the structure of the carbonaceous body and formation of an activated carbon matrix defining a plurality of pores on nanoscale and microscale. The activating conditions (time, temperature and atmosphere) can be adjusted to produce the final product with the desired specific area and composition. Similar to the carbonizing step, due to the high temperature of this activating step, complex chemical reactions and physical changes occur. It is highly desired that at the end of the activation step, the additive is distributed throughout the activated carbon matrix. It is highly desired that at the end of the activation step, the additive is distributed substantially homogeneously throughout the activated carbon matrix. It is highly desired that at the end of the activation step, the additive is present on at least 30%, in certain embodiments at least 40%, in certain other embodiments at least 50%, in certain other embodiments at least 60%, in certain other embodiments at least 80%, of the wall surface area of the pores. It is highly desired that at the end of the activation step, sulfur is distributed throughout the activated carbon matrix. It is highly desired that at the end of the activation step, sulfur is distributed substantially homogeneously throughout the activated carbon matrix. It is highly desired that at the end of the activation step, sulfur is present on at least 30%, in certain embodiments at least 40%, in certain other embodiments at least 50%, in certain other embodiments at least 60%, in certain other embodiments at least 80%, of the wall surface area of the pores.

In certain embodiments of the process of the present invention, all additive-source materials and all sulfur-source materials are included into the batch mixture body by in-situ forming, such as in-situ extrusion, casting, and the like. This process has the advantages of, inter alia: (a) avoiding a subsequent step (such as impregnation) of loading an additive and/or sulfur onto the activated carbon body, thus potentially reducing process steps, increasing overall process yield, and reducing process costs; (b) obtaining a more homogeneous distribution of active sorption sites (additives and sulfur) in the sorbent body than what is typically obtainable by impregnation; and (c) obtaining a durable and robust fixation of the additive and sulfur in the sorbent body, which can withstand the flow of the fluid stream to be treated for a long service period. Impregnation can result in preferential distribution of impregnated species (such as additive and sulfur) on external cell walls, wall surface of large pores (such as those on the micrometer scale). Loading of impregnated species onto a high percentage of the wall surfaces of the nanoscale pores can be time-consuming and difficult. Most of the surface area of activated carbon having high specific area of from 400 to 2000 $m^2 \cdot g^{-1}$ are contributed by the nanoscale pores. Thus, it is believed that it is difficult for a typical impregnation step to result in loading of the impregnated species onto a majority of the specific area of such activated carbon material. Moreover, it is believed that a typical impregnation step can result in a thick, relatively dense layer of the impregnated species on the external cell walls and/or wall surface of large pores, which blocks the fluid passageways into or out of the smaller pores, effectively reducing the sorptive function of the activated carbon. Still further, it is believed that the fixation of the impregnated species in a typical impregnation step in the sorbent body is mainly by relatively weak physical force, which may be insufficient for prolonged use in fluid streams.

Nonetheless, as indicated supra, in certain embodiments, it is not necessary that all the additives and/or sulfur are required to be distributed throughout the activated carbon matrix, let alone substantially homogeneously. In these embodiments, not all of the additive-source materials and sulfur-source materials are formed in situ into the batch mixture body. It is contemplated that, after the activation step, a step of impregnation of certain additives and/or sulfur may be carried out. Alternatively, after the activated step, a step of treating the activated body by a sulfur-containing and/or additive-containing atmosphere may be carried out. Such post-activation loading of additive is especially useful for additives that cannot withstand the carbonization and/or carbonization steps, such as those based on organometallic compounds, e.g., iron acetylacetoriate.

Once the activated sorbent body of the present invention is formed, it may be subjected to post-finishing steps, such as pellitizing, grinding, assembling by stacking, and the like. Sorbent bodies of various shapes and compositions of the present invention may then be loaded into a fixed bed which will be placed into the fluid stream to be treated.

The present invention is further illustrated by the following non-limiting examples.

EXAMPLES

Example 1

An extrusion composition was formulated with 46% liquid phenolic resole resin, 1% lubricating oil, 13% cordierite powder, 9% sulfur powder, 7% iron acetylacetonate, 18% cellulose fiber, 5% Methocel binder and 1% sodium stearate. This mixture was compounded and then extruded. The extruded honeycomb was then dried and cured in air at 150° C. followed by carbonization in nitrogen and activation in carbon dioxide. The activated carbon honeycomb samples were then tested for the mercury removal capability. The test was done at 160° C. with 22 $\mu g \cdot m^{-3}$ inlet elemental mercury concentration. The carrier gas for mercury contained $N_2$, $SO_2$, $O_2$ and $CO_2$. The gas flow rate was 750 ml/minute. The total mercury removal efficiency was 86% while elemental mercury removal efficiency was 100%.

Example 2

Another extrusion composition was extruded similar to Example 1 but with 12% cordierite powder instead of 13% and the iron acetylacetonate at 4% and potassium iodide at 4% instead of 7% iron acetylacetonate. After activation these samples showed 90% total mercury removal and 100% elemental mercury removal. The presence of KI in the composition thus increased the efficiency.

Example 3

In this experiment the extrusion composition was 59% phenolic resole, 1% phosphoric acid, 1% oil, 9% sulfur powder, 3% iron oxide, 19% cellulose fiber, 7% methocel binder and 1% sodium stearate. These samples were extruded, cured, carbonized, activated and tested as in Example 1 for mercury removal performance. The mercury removal efficiency was 87% and 97% for total and elemental mercury, respectively.

Example 4

In this experiment manganese oxide was used as the additives with the composition of 6% $MnO_2$, 13% cordierite, 7% sulfur, 19% cellulose fiber, 5% methocel binder, 1% sodium stearate, 47% phenolic resole, 1% phosphoric acid and 1% oil. The mercury removal efficiency of the samples based on this composition was 92% and 98% for total and elemental mercury, respectively.

Example 5

In this example sulfur was added combined with manganese as MnS instead of elemental sulfur. The composition was 15% cordierite, 10% MnS, 20% cellulose fiber, 5% methocel binder, 1% sodium stearate, 47% phenolic resole, and 1% oil.

On cure, carbonization and activation the mercury removal efficiency of these honeycombs was 84% and 93% for total and elemental mercury.

Example 6

The experiment of Example 5 was repeated but with molybdenum disulfide ($MoS_2$) as the additive. These samples gave mercury removal efficiency of 90% and 96% for total and elemental mercury.

These Examples show that various combinations of additives when incorporated as in-situ catalysts in the extrusion compositions lead to activated carbon honeycombs with high mercury removal efficiencies.

It is expected that these honeycombs will also be useful for removal of other contaminants such as selenium, cadmium and other toxic metals from flue gases as well as in coal gasification.

Example 7

In this experiment the extrusion composition was 14% charcoal, 47% phenol resin, 7% sulfur, 7% manganese oxide, 18% cellulose fiber, 5% mythical binder and 1% sodium separate. These samples were extruded, cured, carbonized and activated as in Example 1.

The samples were then tested for mercury removal capability. The test was done at 140° C. with 24 $\mu g/m^3$ inlet elemental mercury concentration. The carrier gas for mercury contained $N_2$, HCl, $SO_2$, $NO_x$, $O_2$ and $CO_2$ The gas flow rate was 650 ml/minute. The mercury removal efficiency was 100% and 99% for both total and elemental mercury, respectively. See TABLE II below.

Example 8

In this example, the extrusion composition was 16% cured sulfur-containing phenol resin, 45% phenol resin, 8% sulfur, 7% manganese oxide, 18% cellulose fiber, 4% mythical binder and 1% sodium separate. These samples were extruded, cured, carbonized and activated as in Example 1. The activated carbon samples were tested as in Example 7. The mercury removal efficiency was 100% and 99% for both total and elemental mercury, respectively. See TABLE II below. Thus both Examples 7 and 8 achieved excellent mercury removal results.

Various sorbent bodies comprising differing additives were tested for mercury removal efficiency. Test results are listed in TABLE I below. In all tables and drawings in the present application, $Hg^0$ or Hg(0) means elemental mercury; $Hg^T$ or Hg(T) means total mercury, including elemental and oxidized mercury. Eff($Hg^0$) or Eff(Hg(0)) means the instant mercury removal efficiency with respect to elemental mercury, and Eff($Hg^T$) or Eff(Hg(T)) means instant mercury removal efficiency with respect to mercury at all oxidation states. Just as described above, Eff(Hg(x)) is calculated as follows:

$$Eff(\text{Hg}(x)) = \frac{C_0 - C_1}{C_0} \times 100\%,$$

where $C_0$ is the inlet concentration of Hg(x), and $C_1$ is the outlet concentration of Hg(x), respectively, at a given test time.

Comparison of Sample Nos. C and D in TABLE I clearly shows that a sorbent material comprising MnS as an additive tends have higher performance if it also comprises elemental sulfur in the batch mixture material than if it does not comprise elemental sulfur in the batch mixture material.

FIG. 1 is a diagram comparing the mercury removal capability of a tested sample of a sorbent according to the present invention and a comparative sorbent over time. On the left vertical axis is the aggregate amount of mercury per unit mass (MSS, mg·g$^{-1}$) trapped by the tested samples of the tested sorbents. On the right vertical axis is instant mercury removal efficiency of the tested sorbents (Eff(Hg)), which is the instant total mercury removal efficiency measured and calculated according to the formula above. On the horizontal axis is the time the sample was exposed to the test gas. Part of the Eff(Hg) data in this figure are also presented in TABLE III below. The sorbent according to the present invention comprises sulfur, in-situ extruded MnO$_2$ as the additive and about 45% by weight of cordierite as an inorganic filler. Sample 2.2 is a comparative sorbent comprising no in-situ extruded additive, comparable amount of sulfur and cordierite, and impregnated FeSO$_4$ and KI as the additive. Curves 101 and 103 show the Eff(Hg) and MSS of the sorbent according to the present invention, respectively. Curves 201 and 203 show the Eff(Hg) and MSS of the comparative sorbent, respectively. As can be seen from this figure and the data of TABLE III, the sorbent did not show an abrupt drop of mercury removal efficiency even after 250 hours of exposure to a simulated flue gas comprising total mercury at about 20 μg·m$^{-3}$, indicating a fairly large amount of mercury can be trapped by the sorbent material before it reaches saturation (or mercury breakthrough point). The curve 201 and data of TABLE III show that the comparative sorbent had an abrupt, continuous drop of instant mercury removal efficiency within 50 hours until about 70 hours when the test was terminated, indicating an early saturation of the sorbent. Curves 103 and 203 overlap to a certain extent at the early stage of test period, but 203 ends at about 69 hours.

FIG. 1 shows that the sorbent of this embodiment of the present invention, comprising in-situ extruded additive, can have much higher mercury removal capability, especially on the long term, than sorbent having impregnated additives. Without the intention or necessity to be bound by a particular theory, it is believed that the superior performance of the sorbent of the present invention is due to the more homogeneous distribution of the additive, and less blockage of the pores in the activated carbon matrix by the additives.

Figure 2:
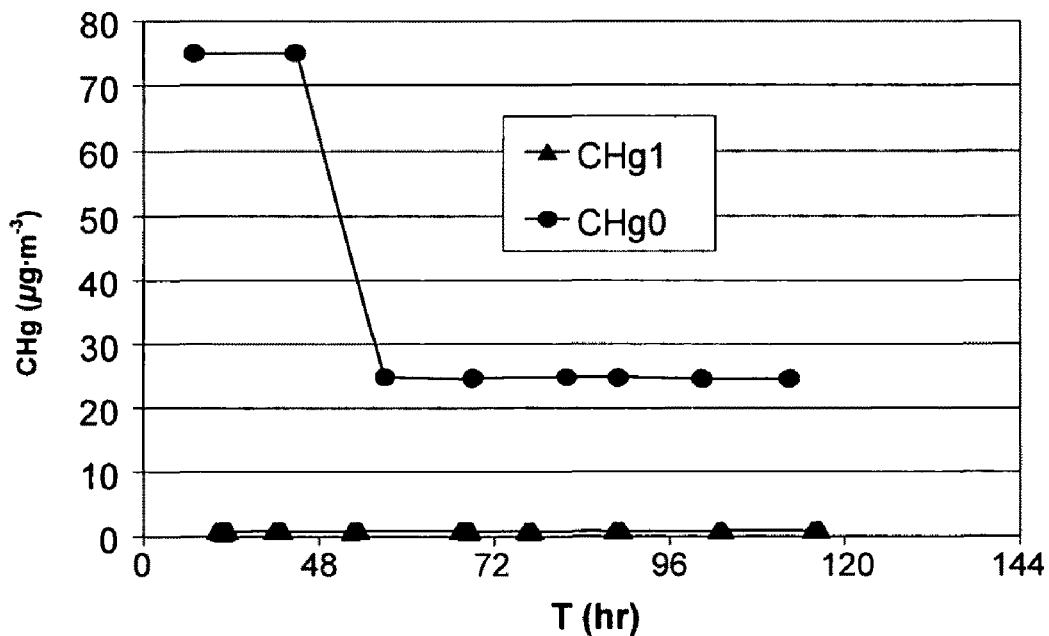
FIG. 2 is a diagram showing the inlet mercury concentration (CHg0) and outlet mercury concentration (CHg1) of a sorbent body according to one embodiment of the present invention a various inlet mercury concentration.

FIG. 2 is a diagram showing the inlet mercury concentration (CHg0) and outlet mercury concentration (CHg1) of sorbent bodies according to one embodiment of the present invention various inlet mercury concentrations. This diagram clearly indicates that the sorbent bodies of certain embodiments of the present invention can be used to remove mercury effectively at various mercury concentration (ranging from above 70 to about 25 μg·m$^{-3}$).

Figure 3:
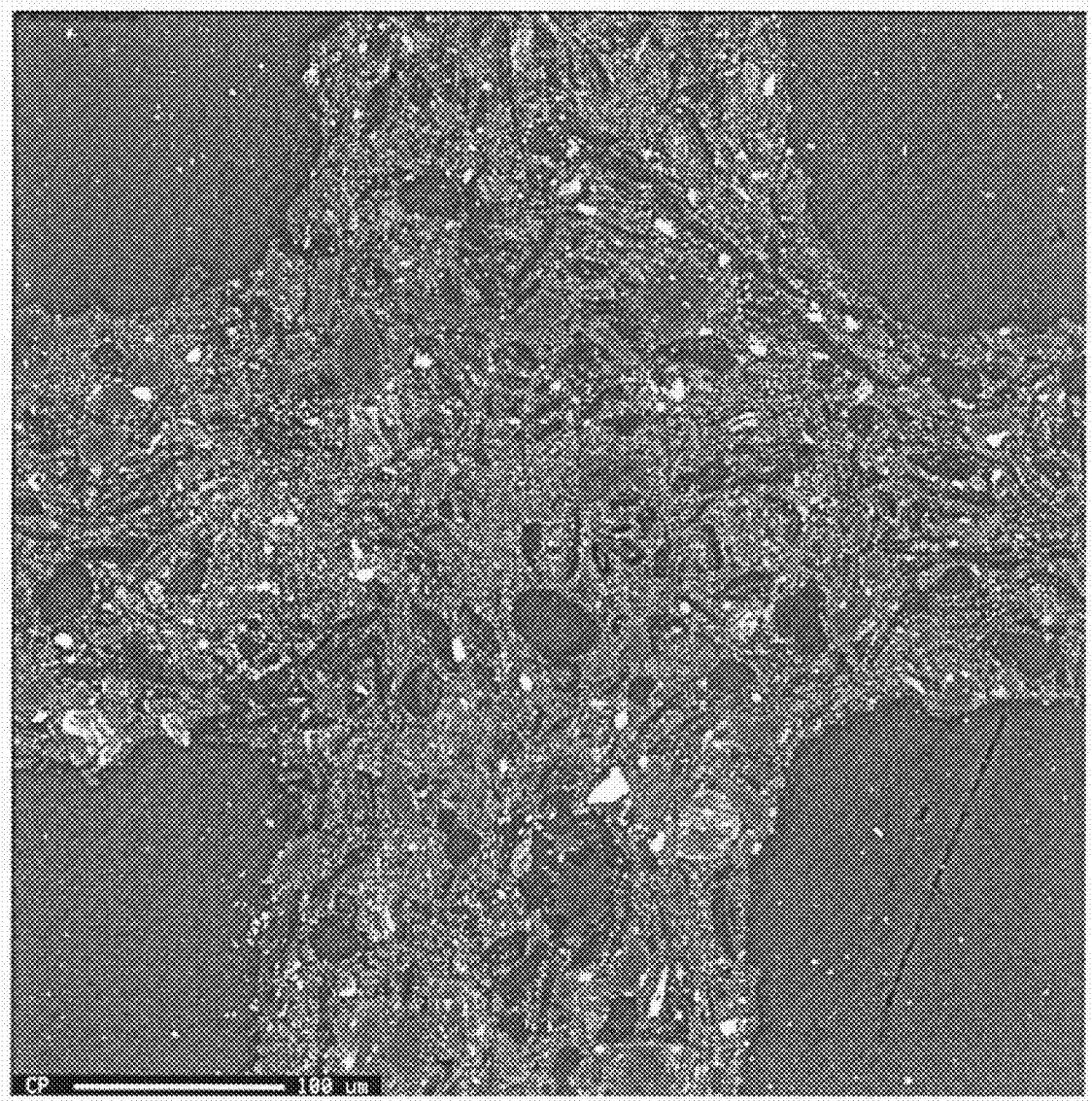
FIG. 3 is an SEM image of part of a cross-section of a sorbent body according to the present invention comprising in-situ extruded additive.
Figure 4:
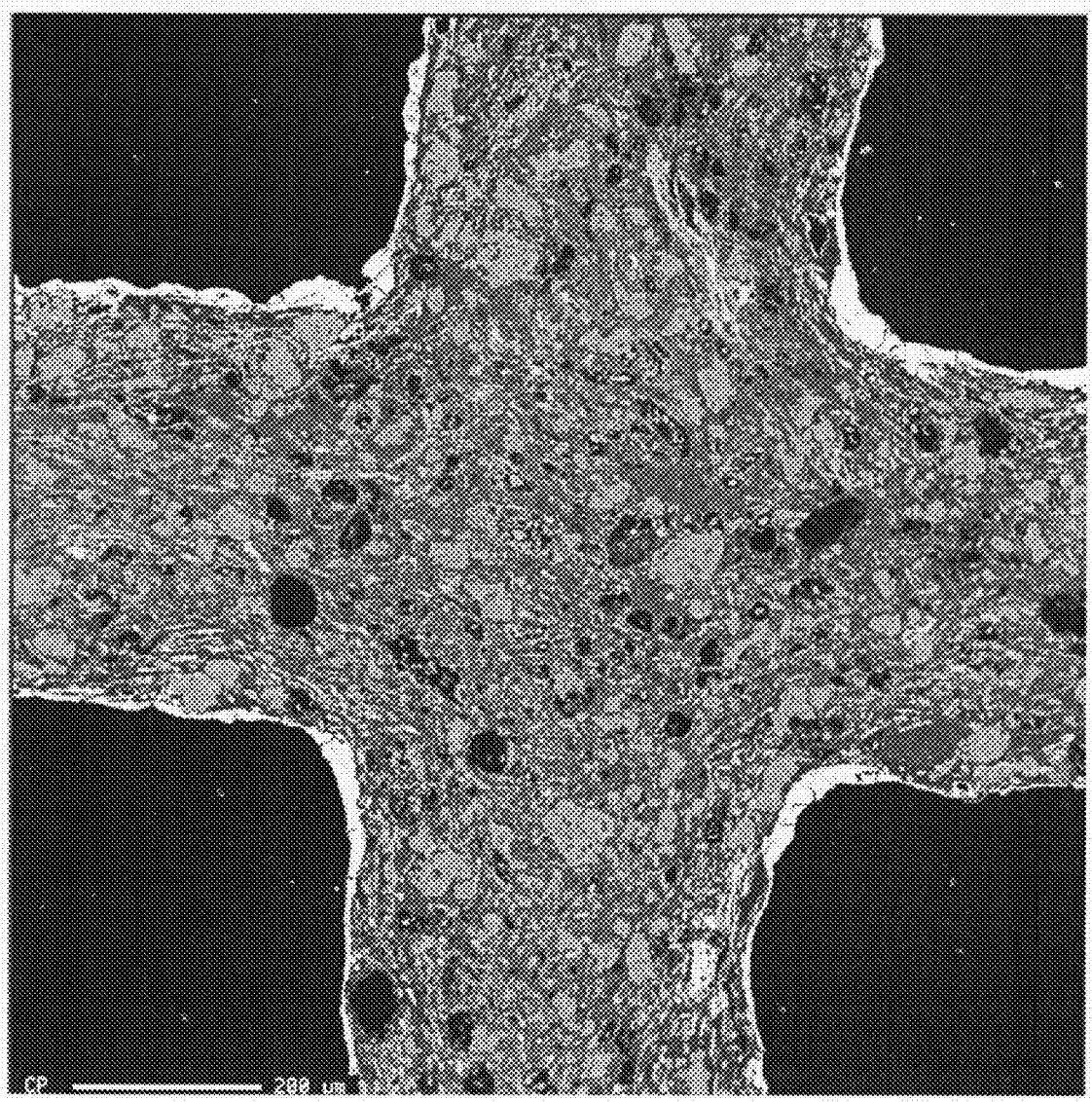
FIG. 4 is an SEM image of part of a cross-section of a comparative sorbent body comprising post-activation impregnated additive.

FIG. 3 is a SEM image of part of a cross-section of a sorbent body according to the present invention comprising in-situ extruded additive. From the image, preferential accumulation of additive or sulfur is not observed. FIG. 4 is a SEM image of part of a cross-section of a comparative sorbent body comprising post-activation impregnated additive. The clearly visible white layer of material on the cell wall is the impregnated additive. It is believed that this relatively dense layer of impregnated layer of additive can block the entrances into many macroscale and nanoscale pores inside the cell walls, reducing the overall performance of the comparative sorbent body.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

TABLE I

| Sample No. | Additive-Source | Test Time (Hours) | Hg$^T$ Inlet Concentration (μg·m$^{-3}$) | Eff(Hg$^0$) (%) | Eff(Hg$^T$) (%) |
|---|---|---|---|---|---|
| A | MnO$_2$ | 20 | 22 | 98 | 92 |
| B | MoS$_2$ | 24 | 22 | 96 | 90 |
| C | MnS (with elemental sulfur in batch) | 20 | 22 | 98 | 92 |
| D | MnS (without elemental sulfur in batch) | 19 | 22 | 93 | 84 |
| E | Cr$_2$O$_3$ | 24 | 22 | 98 | 88 |
| F | CuO and Cu$_2$S | 19 | 22 | 97 | 90 |
| G | Fe$_2$O$_3$ | 20 | 22 | 97 | 87 |
| H | Iron Acetylacetonate (FeAT) | 19 | 22 | 100 | 87 |
| I | FeAT and KI | 20 | 22 | 100 | 90 |

TABLE II

| Example No. | Test Time (Hours) | Hg(T), Inlet Conc. (μg·m$^{-3}$) | Hg(0) Removal Efficiency (%) | Hg(T) Removal Efficiency (%) |
|---|---|---|---|---|
| 7 | 72 | 24 | 99 | 100 |
| 8 | 72 | 22 | 99 | 100 |

TABLE III

| | Mercury removal efficiency (%) | | | | | | | | | | | | | | | | | | | |
|---|---|---|---|---|---|---|---|---|---|---|---|---|---|---|---|---|---|---|---|---|
| | Time (Hr) aa | | | | | | | | | | | | | | | | | | | |
| cc | 1 | 2 | 3 | 5 | 10 | 15 | 20 | 25 | 30 | 35 | 40 | 45 bb | 50 | 60 | 70 | 80 | 100 | 150 | 200 | 250 |
| 101 | 94 | 94 | 92 | 91 | 91 | 90 | 88 | 87 | 87 | 87 | 87 | 87 | 87 | 88 | 88 | 89 | 88 | 85 | 85 | 86 |
| 201 | 79 | 81 | 85 | 83 | 83 | 84 | 84 | 84 | 84 | 83 | 82 | 80 | 77 | 70 | — | — | — | — | — | — | aa: time (hour);
bb: mercury removal efficiency (%);
cc: Curve No. as shown in FIG. 1.

What is claimed is:

1. A sorbent body comprising:
   an activated carbon matrix defining a plurality of pores;
   sulfur;
   an alkaline earth hydroxide; and
   an additive adapted for promoting the abatement of at least one of arsenic, cadmium, mercury and selenium from a fluid stream,
   wherein:
   the additive is distributed throughout the activated carbon matrix, and is selected from sulfides of manganese or molybdenum.

2. A sorbent body according to claim 1, which is a monolith.

3. A sorbent body according to claim 1, wherein sulfur is distributed throughout the activated carbon matrix.

4. A sorbent body according to claim 1, wherein the additive is essentially homogeneously distributed in and on the activated carbon matrix.

5. A sorbent body according to claim 1, wherein sulfur is essentially homogeneously distributed in and on the activated carbon matrix.

6. A sorbent body according to claim 1, wherein at least part of sulfur is present in a state capable of chemically bonding with mercury.

7. A sorbent body according to claim 6, which comprises sulfur on the surface of the walls of the pores of the activated carbon matrix, and wherein at least 10% of the sulfur on the surface of the walls of the pores is essentially at zero valency when measured by XPS.

8. A sorbent body according to claim 1, comprising at least 91% by weight of activated carbon, sulfur and the additive.

9. A sorbent body according to claim 1, comprising from 50% to 97% by weight of activated carbon.

10. A sorbent body according to claim 1, comprising at least 60% by weight of activated carbon.

11. A sorbent body according to claim 1, comprising less than 40% by weight of inorganic filler.

12. A sorbent body according to claim 1, comprising from 1% to 20% by weight of sulfur.

13. A sorbent body according to claim 1, comprising from 1% to 25% by weight of the additive.

14. A sorbent body according to claim 1, wherein the sorbent body is in the form of a honeycomb.

15. A sorbent body according to claim 1, wherein the sorbent body is in the form of a powder or a pellet.

16. A sorbent body according to claim 1, wherein at least a part of the sulfur is chemically bonded to the activated carbon matrix.

17. A sorbent body according to claim 16, wherein at least a part of the sulfur is covalently bonded to the activated carbon matrix.

18. A sorbent body according to claim 17, which comprises elemental sulfur.

19. A sorbent body according to claim 1, which comprises elemental sulfur.

20. A sorbent body according to claim 1, wherein the sorbent body has a mercury removal capacity of at least 0.05 mg·g$^{-1}$ with respect to RFG1, RFG2 and/or RFG3.

21. A sorbent body according to claim 1, wherein the sorbent body is in the form of a honeycomb.

22. A sorbent body according to claim 21, wherein the additive is submerged in or partly embedded in the wall structure of the pores of the activated carbon matrix.

23. A sorbent body according to claim 1, wherein the additive is submerged in or partly embedded in the wall structure of the pores of the activated carbon matrix.

* * * * *

UNITED STATES PATENT AND TRADEMARK OFFICE
CERTIFICATE OF CORRECTION

| | |
|---|---|
| PATENT NO. | : 7,998,898 B2 |
| APPLICATION NO. | : 11/977843 |
| DATED | : August 16, 2011 |
| INVENTOR(S) | : Kishor Purushottam Gadkaree et al. |

Page 1 of 1

It is certified that error appears in the above-identified patent and that said Letters Patent is hereby corrected as shown below:

| No. | Col. | Line | Description |
|---|---|---|---|
| 1 | Title Page | (12) | United States Patent<br>Gadkaree et al. |
| 2 | Title Page | (75) | Inventors: Kishor Purushottam Gadkaree, Big Flats, NY (US); Benedict Y Johnson, Horseheads, NY (US); Peiqiong Q Kuang, Horseheads, NY (US); Anbo Liu, Painted Post, NY (US); Youchun Shi, Horseheads, NY (US) |

Signed and Sealed this
Twentieth Day of March, 2012

David J. Kappos
*Director of the United States Patent and Trademark Office*